United States Patent
Penner et al.

(10) Patent No.: US 10,347,434 B2
(45) Date of Patent: Jul. 9, 2019

(54) ENHANCED CYCLE LIFETIME WITH GEL ELECTROLYTE FOR MNO2 NANOWIRE CAPACITORS

(71) Applicant: THE REGENTS OF THE UNIVERSITY OF CALIFORNIA, Oakland, CA (US)

(72) Inventors: Reginald M. Penner, Newport Beach, CA (US); Mya Le Thai, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 15/584,652

(22) Filed: May 2, 2017

(65) Prior Publication Data

US 2017/0338056 A1 Nov. 23, 2017

Related U.S. Application Data

(60) Provisional application No. 62/461,659, filed on Feb. 21, 2017, provisional application No. 62/330,666, filed on May 2, 2016.

(51) Int. Cl.
| | |
|---|---|
| *H01G 11/36* | (2013.01) |
| *H01G 11/56* | (2013.01) |
| *H01G 11/24* | (2013.01) |
| *H01G 11/80* | (2013.01) |
| *H01M 12/00* | (2006.01) |
| *H01M 12/02* | (2006.01) |
| *B82Y 30/00* | (2011.01) |

(Continued)

(52) U.S. Cl.
CPC .............. *H01G 11/36* (2013.01); *B82Y 30/00* (2013.01); *H01G 11/24* (2013.01); *H01G 11/56* (2013.01); *H01G 11/80* (2013.01); *H01M 4/661* (2013.01); *H01M 10/0565* (2013.01); *H01M 12/005* (2013.01); *H01M 12/02* (2013.01); *B82Y 40/00* (2013.01); *H01M 2010/0495* (2013.01); *Y02E 60/13* (2013.01)

(58) Field of Classification Search
CPC ........ H01G 11/24; H01G 11/29; H01G 11/36; H01G 11/56; H01G 11/80; H01G 11/86; H01M 4/80; H01M 4/131; H01M 4/134; H01M 4/136
See application file for complete search history.

(56) References Cited

U.S. PATENT DOCUMENTS

| | | | | |
|---|---|---|---|---|
| 2010/0233226 | A1* | 9/2010 | Ferain | A61K 9/0009 424/422 |
| 2013/0017453 | A1* | 1/2013 | Ajayan | H01M 4/0438 429/309 |

(Continued)

OTHER PUBLICATIONS

Thai, M. L., et al., "100k Cycles and Beyond: Extraordinary Cycle Stability for MnO₂ Nanowires Imparted by a Gel Electrolyte", ACS Energy Letters, 2016, vol. 1, pp. 57-63.

*Primary Examiner* — Nguyen T Ha
(74) *Attorney, Agent, or Firm* — One LLP

(57) ABSTRACT

A nanowire energy storage device such as a nanowire battery or a capacitor having a cathode comprising a plurality of nanowires and an anode comprising a plurality of nanowires interlaced with the plurality of nanowires of the cathode, and embedded in a PMMA gel electrolyte.

10 Claims, 16 Drawing Sheets

(51) Int. Cl.
*H01M 4/66* (2006.01)
*H01M 10/0565* (2010.01)
*H01M 10/04* (2006.01)
*B82Y 40/00* (2011.01)

(56) References Cited

U.S. PATENT DOCUMENTS

| | | | | |
|---|---|---|---|---|
| 2014/0376158 | A1* | 12/2014 | Kim | H01G 11/24 |
| | | | | 361/502 |
| 2015/0264267 | A1* | 9/2015 | Park | H04N 5/23293 |
| | | | | 348/333.02 |
| 2015/0325852 | A1* | 11/2015 | Wang | H01M 4/366 |
| | | | | 429/231.95 |
| 2016/0248118 | A1* | 8/2016 | Chan | H01M 10/0525 |

* cited by examiner

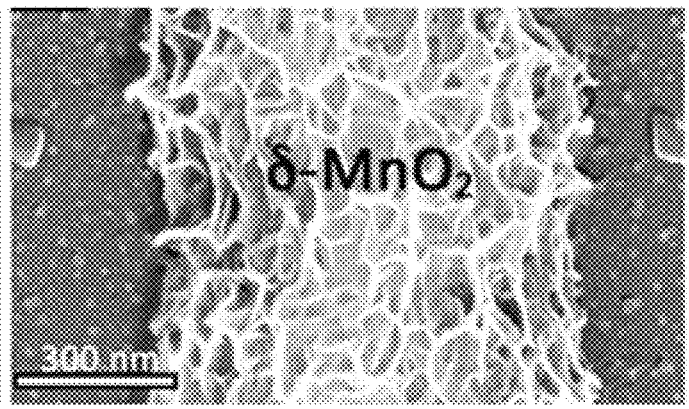
FIGURE 2C  FIGURE 2D
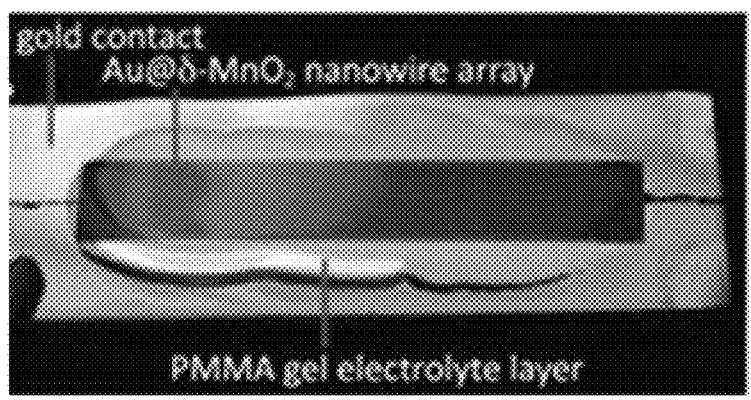
FIGURE 2E

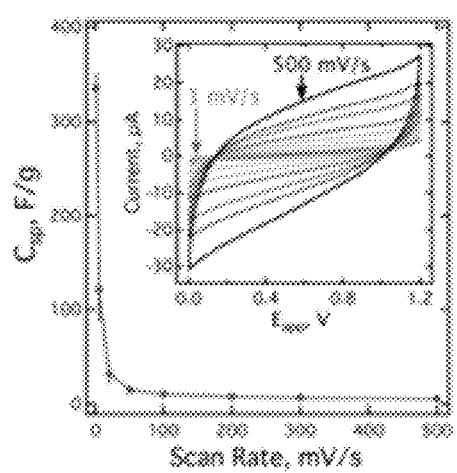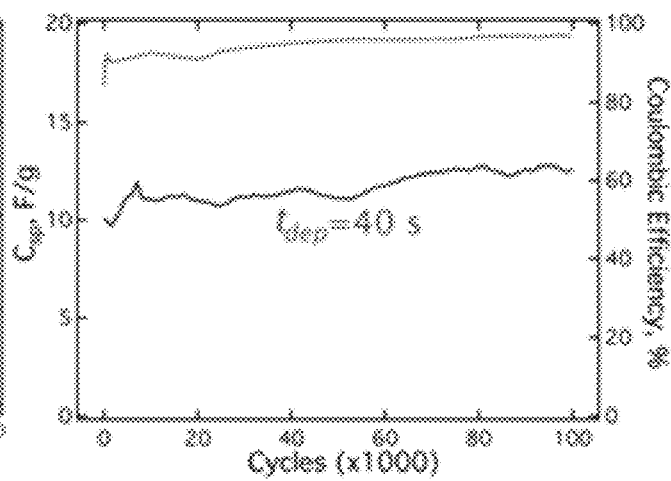
FIGURE 6I
FIGURE 6J

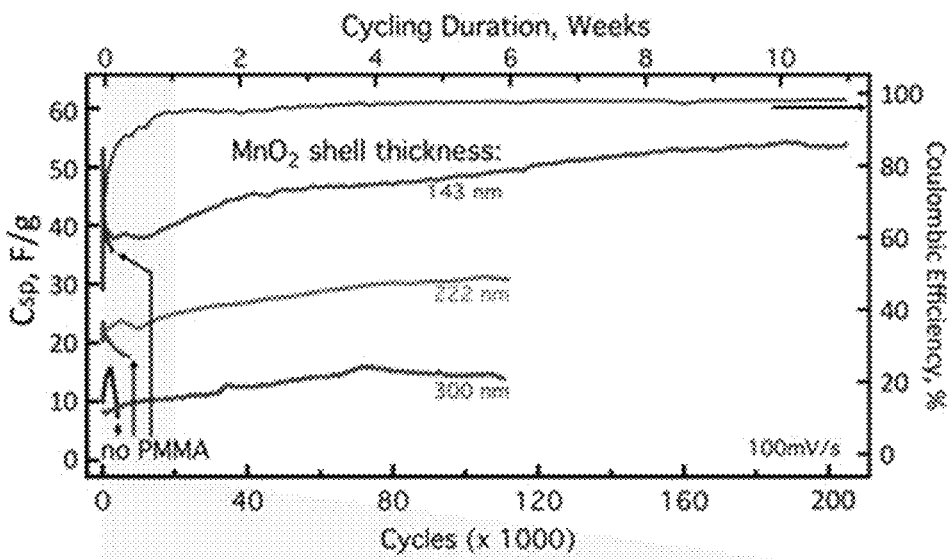
FIGURE 7A
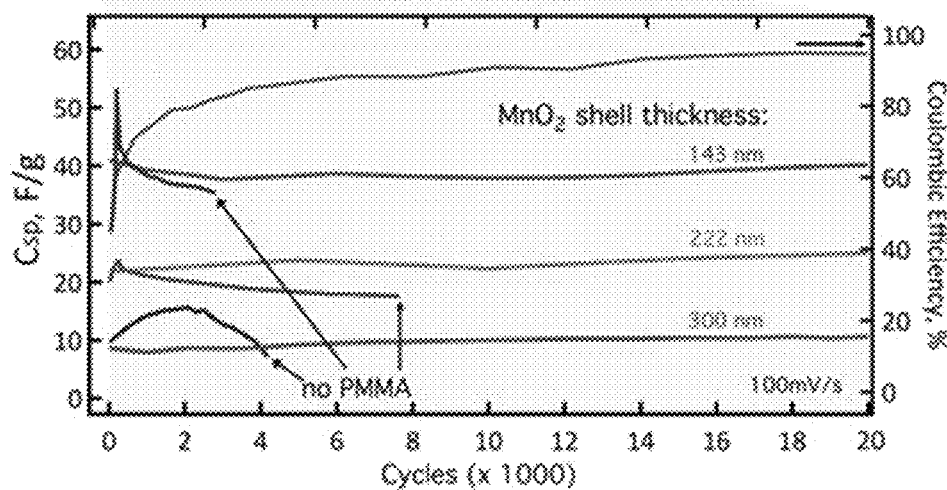
FIGURE 7B
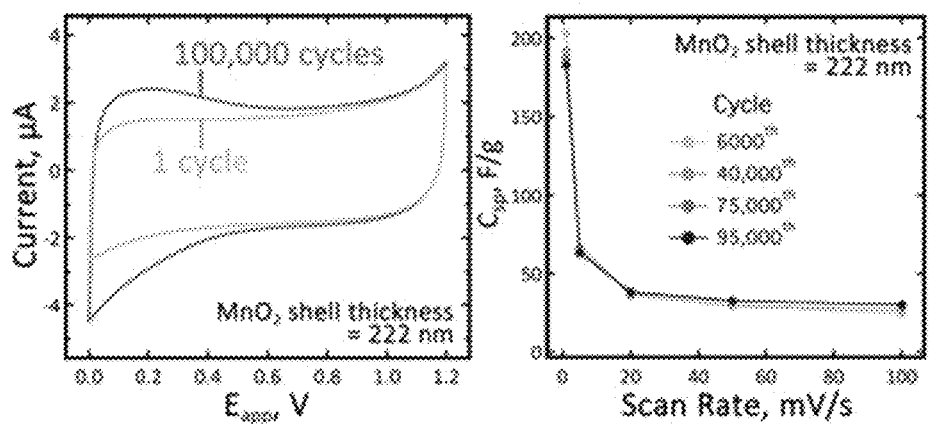
FIGURE 7C
FIGURE 7D

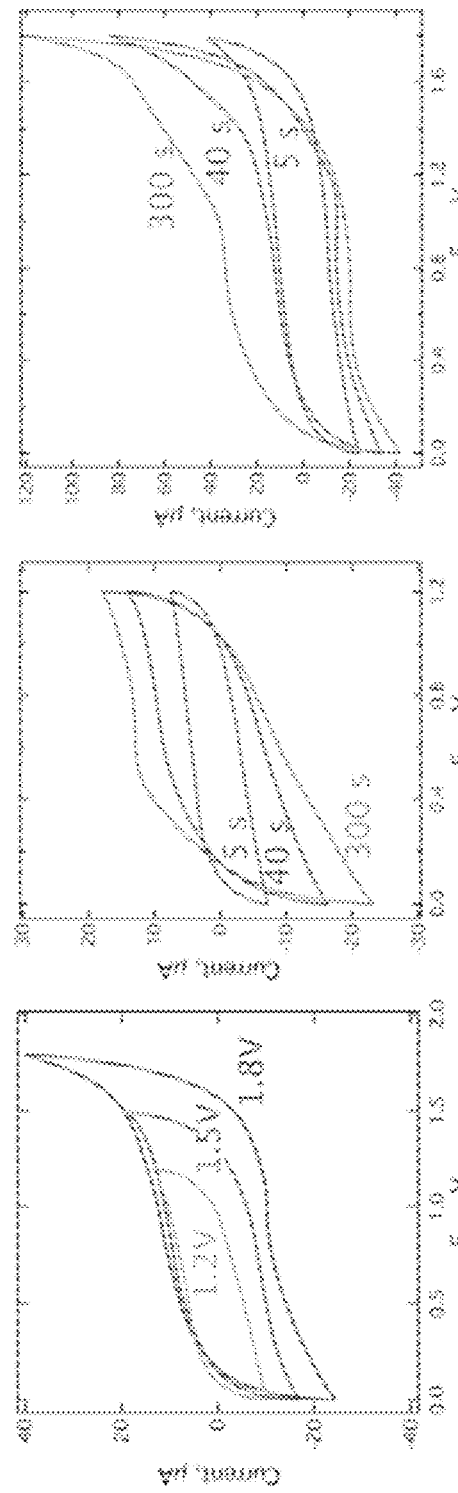
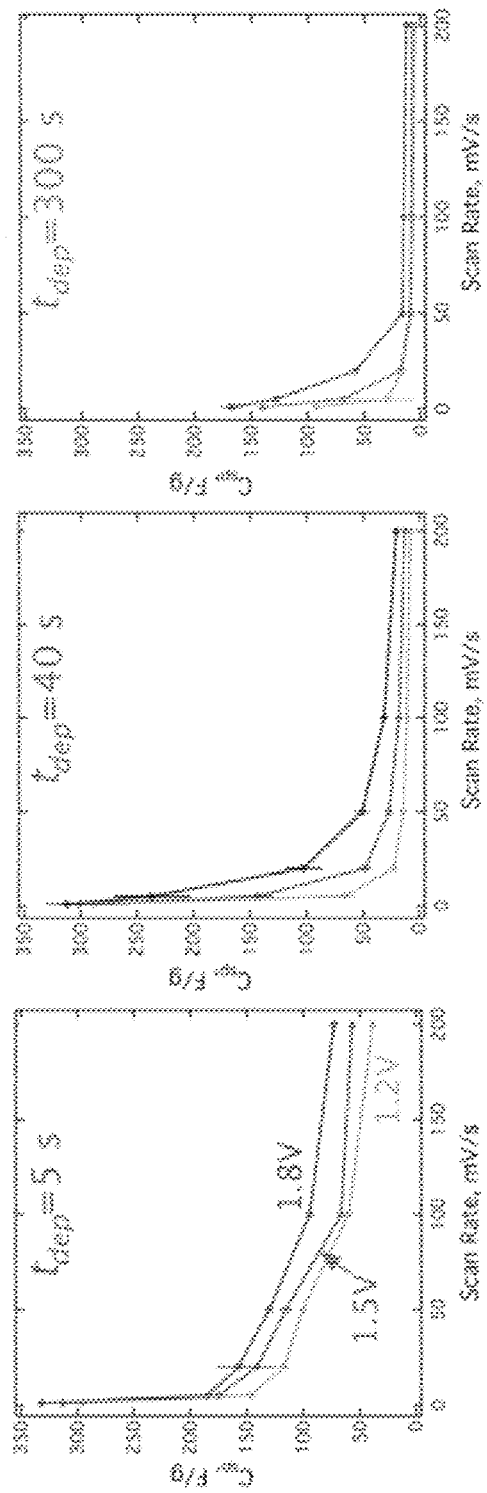
FIGURE 9A  FIGURE 9B  FIGURE 9C
FIGURE 9D  FIGURE 9E  FIGURE 9F

ENHANCED CYCLE LIFETIME WITH GEL ELECTROLYTE FOR MNO2 NANOWIRE CAPACITORS

CROSS-REFERENCE TO RELATED APPLICATIONS

The present application claims priority to U.S. Provisional Patent Application No. 62/330,666 titled "Enhanced Cycle Lifetime With Gel Electrolyte For $MnO_2$ Nanowire Capacitors" and filed on May 2, 2016, and U.S. Provisional Patent Application No. 62/461,659, titled "Enhanced Cycle Lifetime With Gel Electrolyte For $MnO_2$ Nanowire Capacitors" and filed on Feb. 21, 2017, the contents of which are hereby incorporated by reference in their entirety.

FIELD

The subject matter described herein relates generally to energy storage devices and, more particularly, to systems and methods that facilitate the expansion of cycle stability for nanowire-based energy storage devices.

BACKGROUND

The nanowire morphology can enable higher power in either batteries or capacitors than is possible using a film of the same material. The drawback of such nanowires for energy storage is cycle stability. For example, the capacitors operating in propylene carbonate (PC) 1.0 M LiClO4 show dramatically reduced cycle stabilities ranging from 2,000-8,000 cycles. In the piqued PC electrolyte, the δ-MnO2 shell fractures, delaminates, and separates from the gold nanowire current collector. The diminutive lateral dimension of nanowires increases their susceptibility to dissolution and corrosion and these processes rapidly result in a loss of electrical continuity through the nanowire and an irreversible loss of capacity.

Therefore, it is desirable to provide systems and methods that facilitate the expansion of cycle stability for nanowire-based energy storage devices.

SUMMARY

The various embodiments provided herein are generally directed to systems and methods that facilitate reversible cycle stability for nanowire-based storage devices such as batteries and capacitors. For symmetrical δ-MnO2 nanowire-based storage devices such as batteries and capacitors operating across a 1.2 V voltage window in a poly(methylmethacrylate)-PMMA gel electrolyte the reversible cycle stability increased up to 200,000 cycles with 94-96% average coulombic efficiency. The high viscosity and elasticity of the PMMA gel tends to prevent separation of MNO2 from the current collector while remaining transparent to fluxes of Li+ involved in insertion and de-insertion. The deleterious processes are not observed in the PMMA electrolyte.

Embodiments of the present disclosure also relate to a 3D nanowire capacitor, comprising stacked, planar 2D nanowire layers separated by thin PMMA gel electrolyte layers, operating across a 1.8 V voltage window. Such two-layer capacitors produce ultra-high cycle stability—to 100,000 cycles—also observed for single layers of nanowires operating in a PMMA gel electrolyte disclosed herein. The "sandwich" capacitor architecture disclosed herein includes two 4000 nanowire layers separated by a very thin 2 μm layer of PMMA gel electrolyte. This sandwich capacitor can be thought of as a "unit cell" of a many-layered, 3D capacitor comprising tens or hundreds of planar nanowire layers, spaced by micron-scale PMMA gel electrolyte layers.

The embodiments provided herein could be applied to study different materials and energy storage systems.

The systems, methods, features and advantages of the invention will be or will become apparent to one with skill in the art upon examination of the following figures and detailed description.

BRIEF DESCRIPTION

The details of the example embodiments, including structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

FIG. 2C is a high-magnification SEM image of a gold nanowire core of the Au@δ-MnO2 nanowires of FIG. 2B, according to embodiments of the present disclosure.

FIG. 2D is a high-magnification SEM image of an exemplary Au@δ-MnO2 nanowire of FIG. 2B, according to embodiments of the present disclosure.

FIG. 2E is a photograph of an exemplary Au@δ-MnO2 single-layer capacitor as depicted in the embodiment of FIG. 2A.

FIG. 6I illustrates voltammograms at scan rates from 1 mV/s to 500 mV/s across $V_{max}$=1.2V and a plot of $C_{sp}$ versus scan rate from the data, according to embodiments of the present disclosure.

FIG. 6J illustrates $C_{sp}$ at 100 mV/s up to 100,000 cycles according to embodiments of the present disclosure.

FIG. 7A illustrates $C_{sp}$ versus cycles for various MnO2 shell thicknesses, according to embodiments of the present disclosure.

FIG. 7B illustrates $C_{sp}$ versus cycles for various MnO2 shell thicknesses, according to embodiments of the present disclosure.

FIG. 7C illustrates CVs at 100 mV/s for an exemplary 222 nm MnO2 shell thickness, according to embodiments of the present disclosure.

FIG. 7D illustrates $C_{sp}$ versus scan rate for an exemplary 222 nm MnO2 shell thickness, according to embodiments of the present disclosure.

FIG. 9A illustrates cyclic voltammograms (CVs) at 200 mV/s for nanowires prepared with a MnO2 deposition time, $t_{dep}$=5 s (dMnO2=65 nm), according to embodiments of the present disclosure.

FIG. 9B illustrates CVs for nanowires at 200 mV/s for Vmax=1.2V, according to embodiments of the present disclosure.

FIG. 9C illustrates CVs for nanowires at 200 mV/s for Vmax=1.8V, according to embodiments of the present disclosure.

FIG. 9D illustrates $C_{sp}$ versus scan rate for MnO2 nanowire arrays with a deposition time of $t_{dep}$=5 s, according to embodiments of the present disclosure.

FIG. 9E illustrates $C_{sp}$ versus scan rate for MnO2 nanowire arrays with a deposition time of $t_{dep}$=40 s, according to embodiments of the present disclosure.

FIG. 9F illustrates $C_{sp}$ versus scan rate for MnO2 nanowire arrays with a deposition time of $t_{dep}$=300 s, according to embodiments of the present disclosure.

It should be noted that the figures are not necessarily drawn to scale and that elements of similar structures or functions are generally represented by like reference numerals for illustrative purposes throughout the figures.

DESCRIPTION

The various embodiments provided herein are generally directed to systems and methods that facilitate increased reversible cycle stability in nanowire energy storage devices such as nanowire-based capacitors or batteries. In certain embodiments, the reversible cycle stability is increased by replacing a liquid electrolyte such as, e.g., propylene carbonate (PC) with a poly(methyl methacrylate) (PMMA) gel electrolyte. In certain embodiments, the reversible cycle stability increases to more than about 100,000 to about 200,000 cycles. For example, for symmetrical δ-MnO2 nanowire-based storage devices such as batteries and capacitors operating across a 1.2 V voltage window in a poly (methyl methacrylate)-PMMA gel electrolyte the reversible cycle stability increased up to 200,000 cycles with 94-96% average coulombic efficiency.

Embodiments of the present disclosure also relate to a 3D nanowire capacitor, comprising stacked, planar 2D nanowire layers separated by thin PMMA gel electrolyte layers, operating across a 1.8 V voltage window. Such two-layer capacitors produce ultra-high cycle stability—to 100,000 cycles—also observed for single layers of nanowires operating in a PMMA gel electrolyte disclosed herein. The "sandwich" capacitor architecture disclosed herein includes two 4000 nanowire layers separated by a very thin 2 µm layer of PMMA gel electrolyte. This sandwich capacitor can be thought of as a "unit cell" of a many-layered, 3D capacitor comprising tens or hundreds of planar nanowire layers, spaced by micron-scale PMMA gelelectrolyte layers.

Figure 1A:
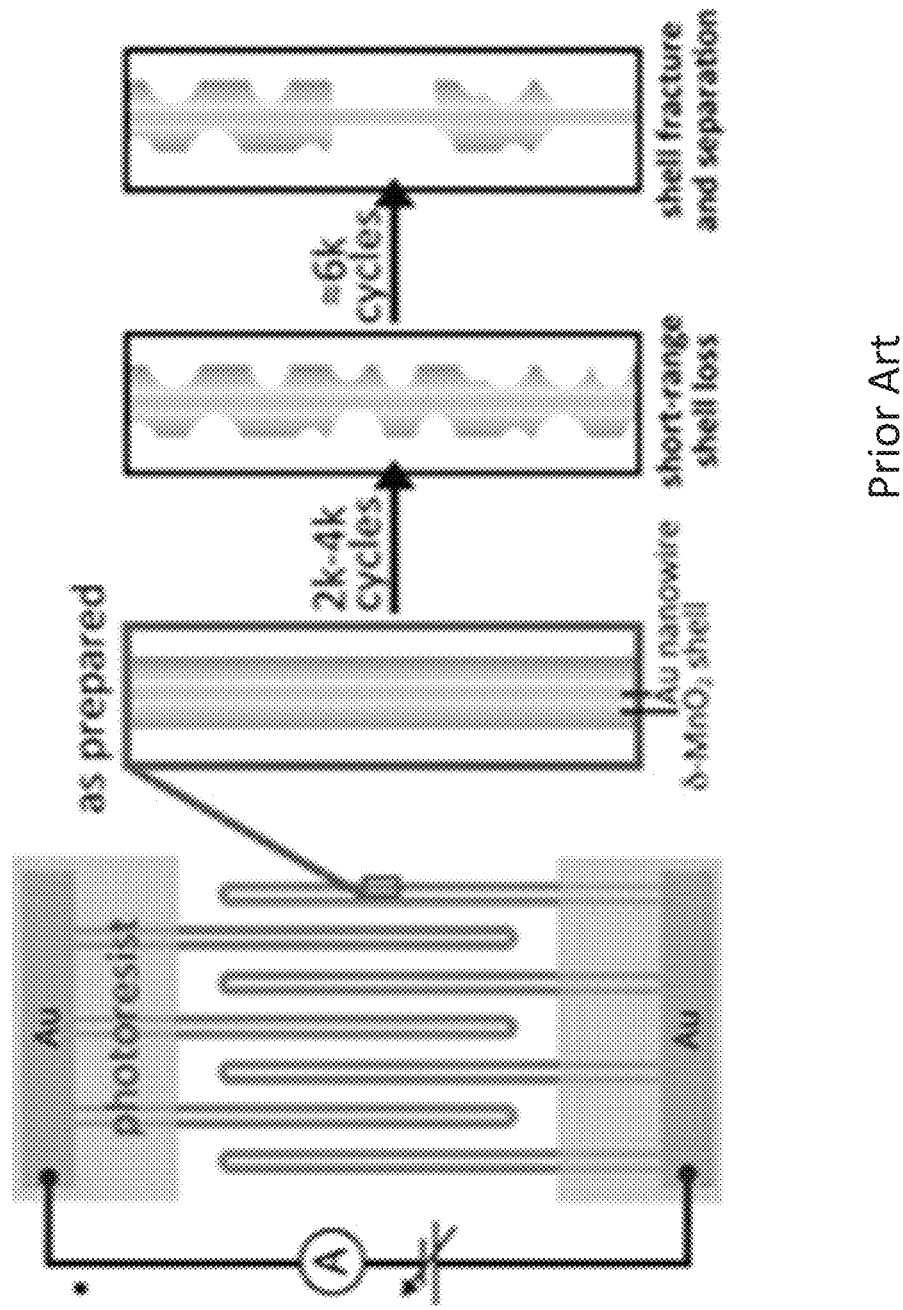
FIG. 1A is an illustration of a nanowire-based energy storage device including a non-PMMA gel PC electrolyte.

FIG. 1A is an illustration of a nanowire-based energy storage device. A nanowire energy storage device such as nanowire battery or a capacitor, having a cathode comprising a plurality of nanowires and an anode comprising a plurality nanowires interlaced with the plurality of nanowires of the cathode. The cathode and the anode may be embedded in a non PMMA electrolyte gel.

Figure 1B:
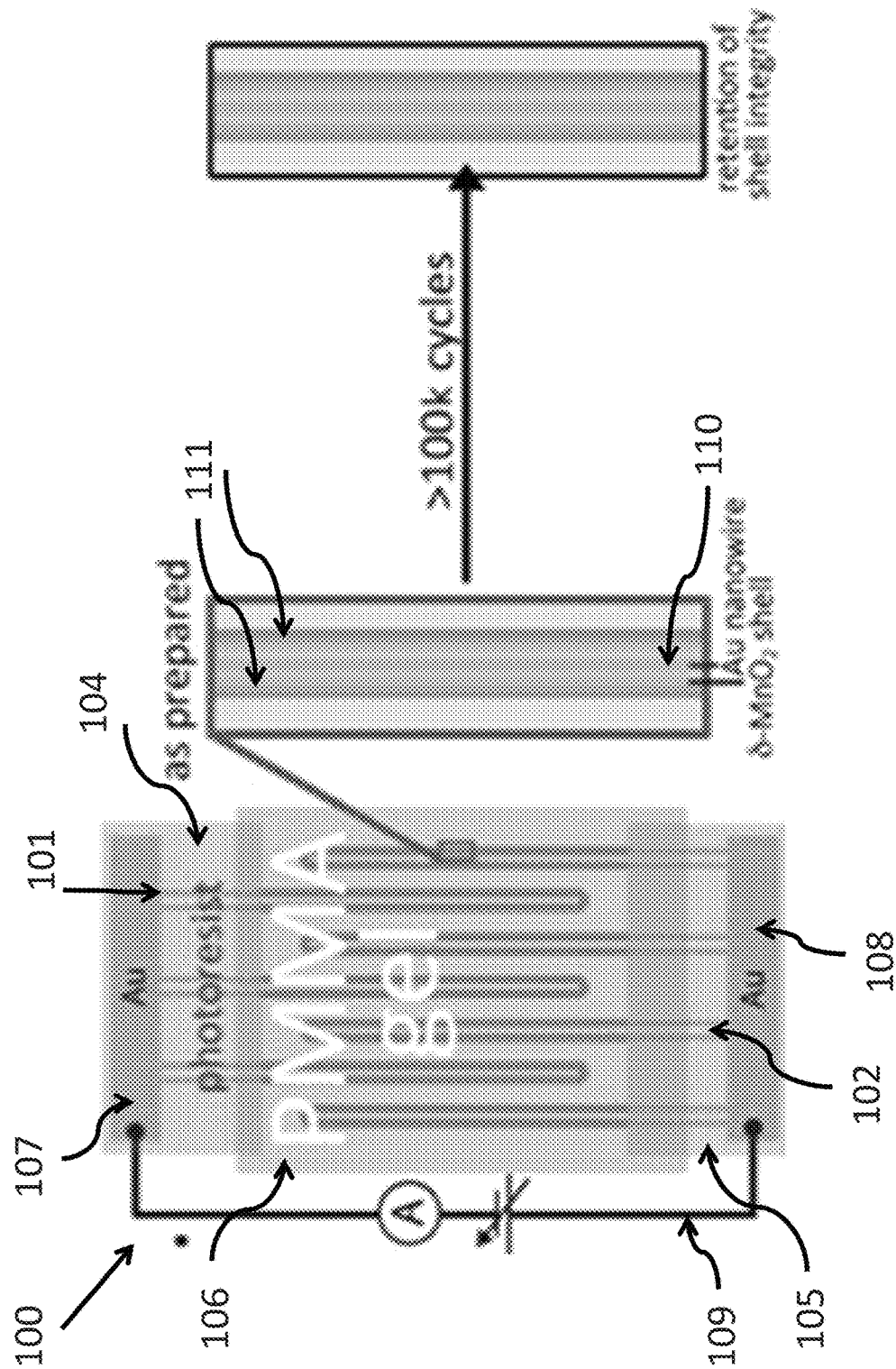
FIG. 1B is an illustration of an exemplary nanowire-based single-layer energy storage device including a PMMA gel electrolyte, according to embodiments of the present disclosure.

FIG. 1B is an illustration of an exemplary nanowire-based energy storage device 100 including a PMMA gel electrolyte 106, according to embodiments of the present disclosure. A nanowire energy storage device 100 such as nanowire battery or a capacitor, having a cathode 108 comprising a plurality of nanowires 102 and an anode 107 comprising a plurality nanowires 101 interlaced with the plurality of nanowires 102 of the cathode 108, preferably includes a PMMA gel electrolyte 106 in which the plurality of nanowires 108 of the cathode 102 and the plurality of nanowires 107 of the anode 101 embedded. The nanowires 101, 102, are further shown embedded in photoresist 104, 105, and coupled to metal contacts 109, such as, e.g., gold contacts. The nanowires have an Au core 110 and a δ-MnO2 shell 111.

To investigate the increase in reversible cycle stability, a new Degradation and Failure Discovery Platform was used, comprising a symmetrical, all-nanowire capacitor comprising two interpenetrating arrays of 375 ultra-long nanowires patterned lithographically onto glass, using a lithographically patterned nanowire electrodeposition (LPNE) process. The nanowires have an Au@δ-MnO2, core@shell architecture in which a central gold nanowire current collector is surrounding by an electrodeposited layer of δ-MnO2 that has a thickness of between 143 nm and 300 nm. An evaluation was conducted of the charge storage performance and cycle stability of Au@MnO2 nanowires with MnO2 shell thicknesses in electrolyte of 1.0 M LiClO4 in propylene carbonate (PC) with added 20 (w/w) % poly(Methylmethacrylate) or PMMA.

These experiments demonstrate for the first time that nanowire-based battery and capacitor electrodes are capable of providing extremely long cycle lifetimes. These devices last exceptionally longer than what has been reported for nanowire energy storage devices and still maintain the right capacitance as in liquid electrolyte.

Figure 2A:
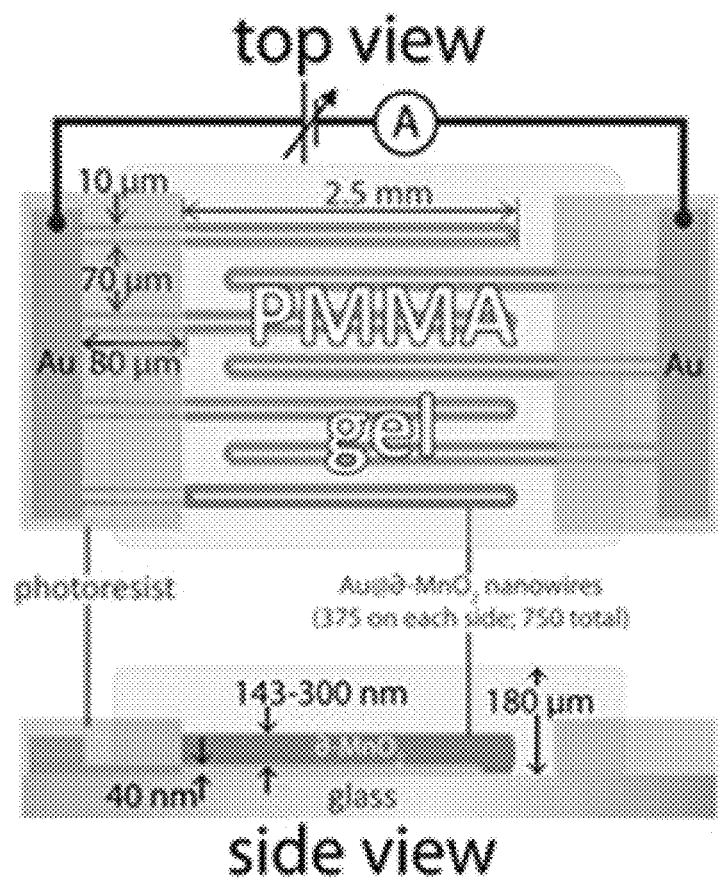
FIG. 2A is a schematic showing dimensions of an exemplary Au@δ-MnO2 single-layer nanowire capacitor according to embodiments of the present disclosure.

FIG. 2A is a schematic showing dimensions of an exemplary Au@δ-MnO2 nanowire capacitor according to embodiments of the present disclosure. According to one embodiment, the capacitor can comprise 375 Au@δ-MnO2 nanowires on each side, totaling 750 Au@δ-MnO2 nanowires.

According to one embodiment, as viewed in the top view of FIG. 2A, a distance from an outer surface of photoresist to a nanowire is 10 µm, and a distance between two nanowires (i.e., from an outer surface of a first nanowire to an outer surface of a second nanowire) is 70 µm. A distance from a first photoresist surface, the first photoresist surface in contact with a PMMA gel, to a second photoresist surface, the second photo resist surface in contact with an Au anode or cathode (i.e. a distance from PMMA gel electrolyte to Au cathode or anode, the distance filled with photoresist) is 80 µm. A nanowire can protrude into the PMMA gel electrolyte 2.5 mm, making the full length of the nanowire 2.5 mm+80 µm, where 80 µm of the nanowire is surrounded by photoresist and 2.5 mm of the nanowire is surrounded by PMMA gel electrolyte.

As viewed in the side view of FIG. 2A, an electrodeposited layer of δ-MnO2 has a thickness of between 143 nm and 300 nm, and a thickness of PMMA gel electrolyte is 180 µm. A thickness of a nanowire is 40 nm.

By design, the ultralong nanowires in these capacitors amplify the influence of degradation processes that culminate in breakage of the nanowire because for ultralong nanowires, breakage "disconnects" a larger fraction of the total energy storage capacity of the electrode. Because Lixδ-MnO2 has a low electrical conductivity for all accessible values of x (<0.005 S/cm), the preparation of ultralong nanowires includes a core-shell architecture in which a gold nanowire current collector is located in the center of a δ-MnO2 shell.

Figure 2B:
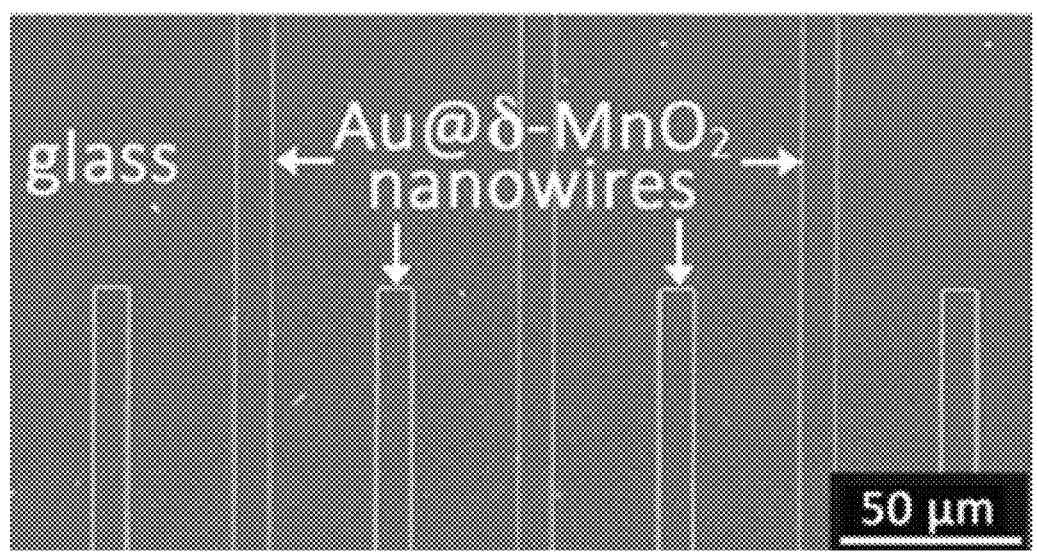
FIG. 2B is a low-magnification image of exemplary Au@δ-MnO2 nanowires on a surface of the exemplary Au@δ-MnO2 single-layer capacitor of FIG. 2A, according to embodiments of the present disclosure.

FIG. 2B is a low-magnification image of exemplary Au@-MnO2 nanowires on a surface of the exemplary Au@-MnO2 capacitor of FIG. 2A, according to embodiments of the present disclosure. These Au@-MnO2 nanowires were prepared using the LPNE process described previously, except for the replacement of a liquid PC or acetonitrile-based electrolyte with a 180 μm thick gel electrolyte layer composed of 20 (w/w) % PMMA and 1.0 M LiClO4 in PC.

FIG. 2C is a high-magnification SEM image of a gold nanowire core of the Au@-MnO2 nanowires of FIG. 2B, according to embodiments of the present disclosure. The nanowires have lateral dimensions of 35 nm (height)×240 nm (w).

FIG. 2D is a high-magnification SEM image of an exemplary Au@δ-MnO2 nanowire of FIG. 2B, according to embodiments of the present disclosure. FIG. 2D shows the morphology of the electrodeposited δ-MnO2 shell with a mean thickness of 124 nm.

FIG. 2E is a photograph of an exemplary Au@-MnO2 capacitor as depicted in the embodiment of FIG. 2A. The capacitor contains 750 parallel nanowire loops.

According to certain embodiments, the thickness of a PMMA gel layer in an Au@δ-MnO2 capacitor can be reduced. This is achieved by building the Au@-MnO2 capacitor using two-layers of nanowires. Each of the layers of nanowires is more densely packed than in the embodiment of FIG. 2A. Even when $d_{gel}$ is reduced from 180 μm (in FIG. 2A) to 2 μm, two layers of nanowires are used instead of one, the nanowire packing density within both layers are increased by a factor of 5, and $V_{max}$ is increased by 50% to 1.8 V, the cycle stability to 100,000 cycles is retained.

Figure 3A:
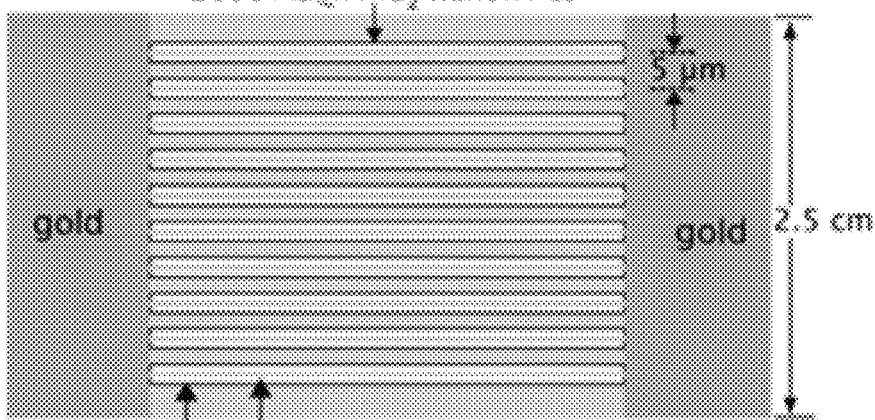
FIG. 3A is a schematic showing dimensions of an exemplary two-layer Au@δ-MnO2 nanowire capacitor, according to embodiments of the present disclosure.

FIG. 3A is a schematic showing dimensions of an exemplary two-layer Au@-MnO2 nanowire capacitor, according to embodiments of the present disclosure. The capacitor has an array of 2000 Au@-MnO2 nanowires. The PMMA gel layer is omitted in this schematic, exposing the nanowires.

Figure 3B:
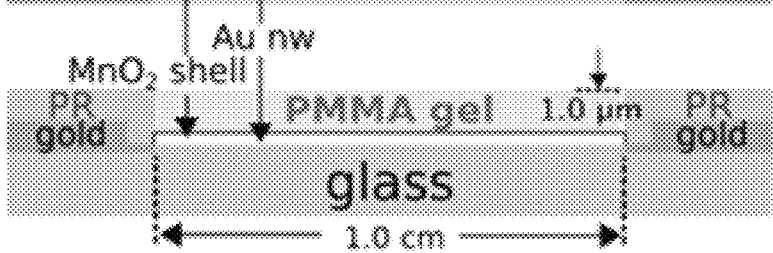
FIG. 3B is a side view schematic diagram of the exemplary two-layer Au@δ-MnO2 nanowire capacitor of FIG. 3A.

FIG. 3B is a side view schematic diagram of the exemplary two-layer Au@-MnO2 nanowire capacitor of FIG. 3A. The Au@-MnO2 all nanowire capacitor has a $d_{gel}$=1.0 μm gel layer covering the nanowires in each of the two layers.

Figure 3C:
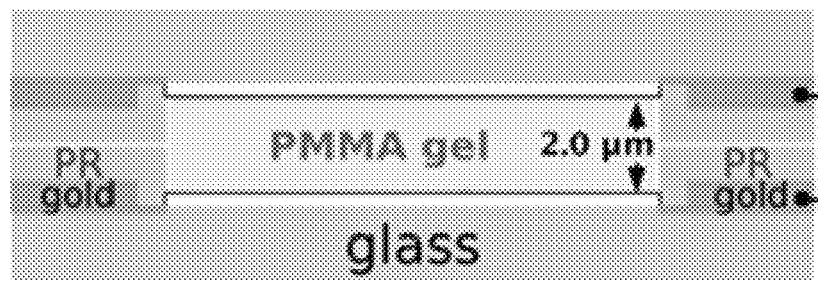
FIG. 3C is a side view schematic diagram of the exemplary two-layer Au@δ-MnO2 nanowire capacitor of FIG. 3A.

FIG. 3C is a side view schematic diagram of the exemplary two-layer Au@-MnO2 nanowire capacitor of FIG. 3A. The capacitor shows a dgel=2.0 μm PMMA gel electrolyte layer. This array of 4000 nanowires is 1.0 cm in total length. Two 4000 nanowire layers supported on glass slides are placed face-to-face to construct the two-layer Au@δ-MnO2 nanowire (or "sandwich") capacitor. One of the nanowire layers is configured as the (+)-electrode and the other as the (−)-electrode.

Figure 3D:
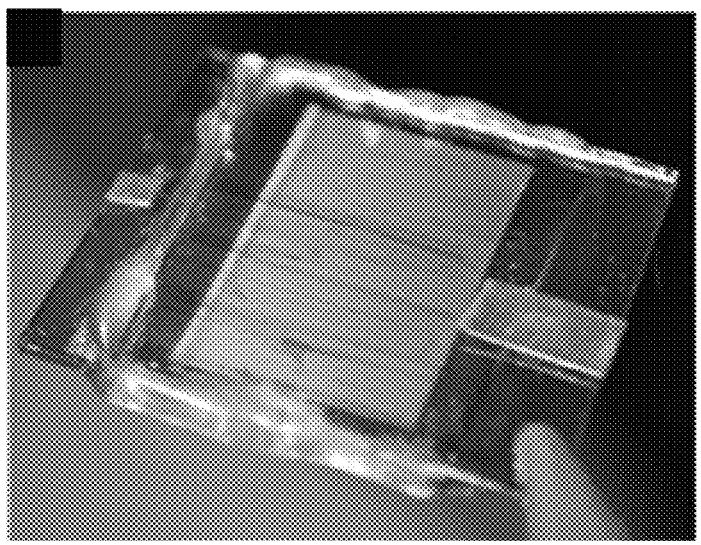
FIG. 3D is a photograph of an exemplary two-layer Au@δ-MnO2 nanowire capacitor as depicted in the embodiment of FIGS. 3A-3C.

FIG. 3D is a photograph of an exemplary two-layer Au@δ-MnO2 nanowire capacitor as depicted in the embodiment of FIGS. 3A-3C. The capacitor contains two Au@δ-MnO2 nanowire layers on glass, as shown schematically in FIG. 3C. The capacitor is hermetically sealed by applying hot glue to the edges of the glass slides.

Figure 3E:
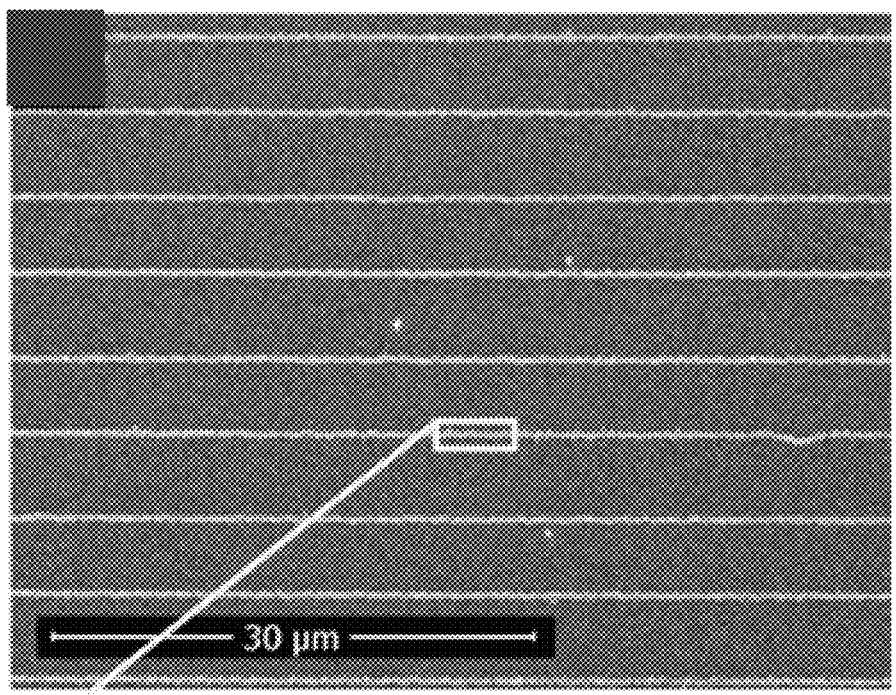
FIG. 3E is a low magnification SEM image of exemplary Au@δ-MnO2 nanowires, according to embodiments of the present disclosure.

FIG. 3E is a low magnification SEM image of exemplary Au@δ-MnO2 nanowires, according to embodiments of the present disclosure. The Au@δ-MnO2 nanowires are spaced laterally by 5 μm.

Figure 3F:
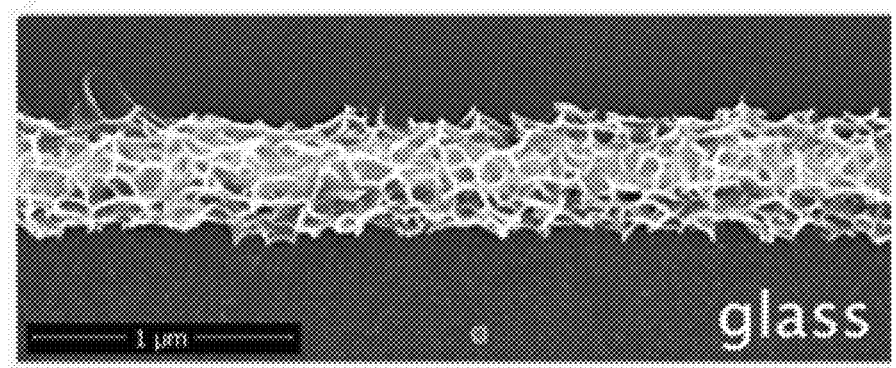
FIG. 3F is a higher magnification image (as compared to FIG. 3E) of an exemplary Au@δ-MnO2 nanowire, according to embodiments of the present disclosure.

FIG. 3F is a higher magnification image (as compared to FIG. 3E) of an exemplary Au@δ-MnO2 nanowire, according to embodiments of the present disclosure.

Figure 3G:
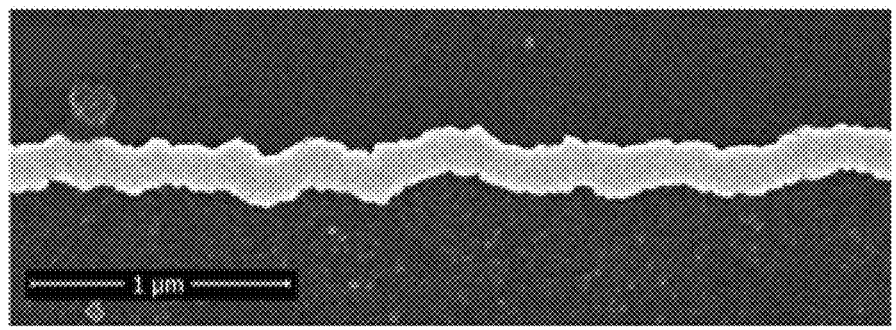
FIG. 3G is an SEM image of a gold nanowire like that at the center of an exemplary Au@δ-MnO2 nanowire, according to embodiments of the present disclosure.

FIG. 3G is an SEM image of a gold nanowire like that at the center of an exemplary Au@δ-MnO2 nanowire, according to embodiments of the present disclosure.

Figure 4:
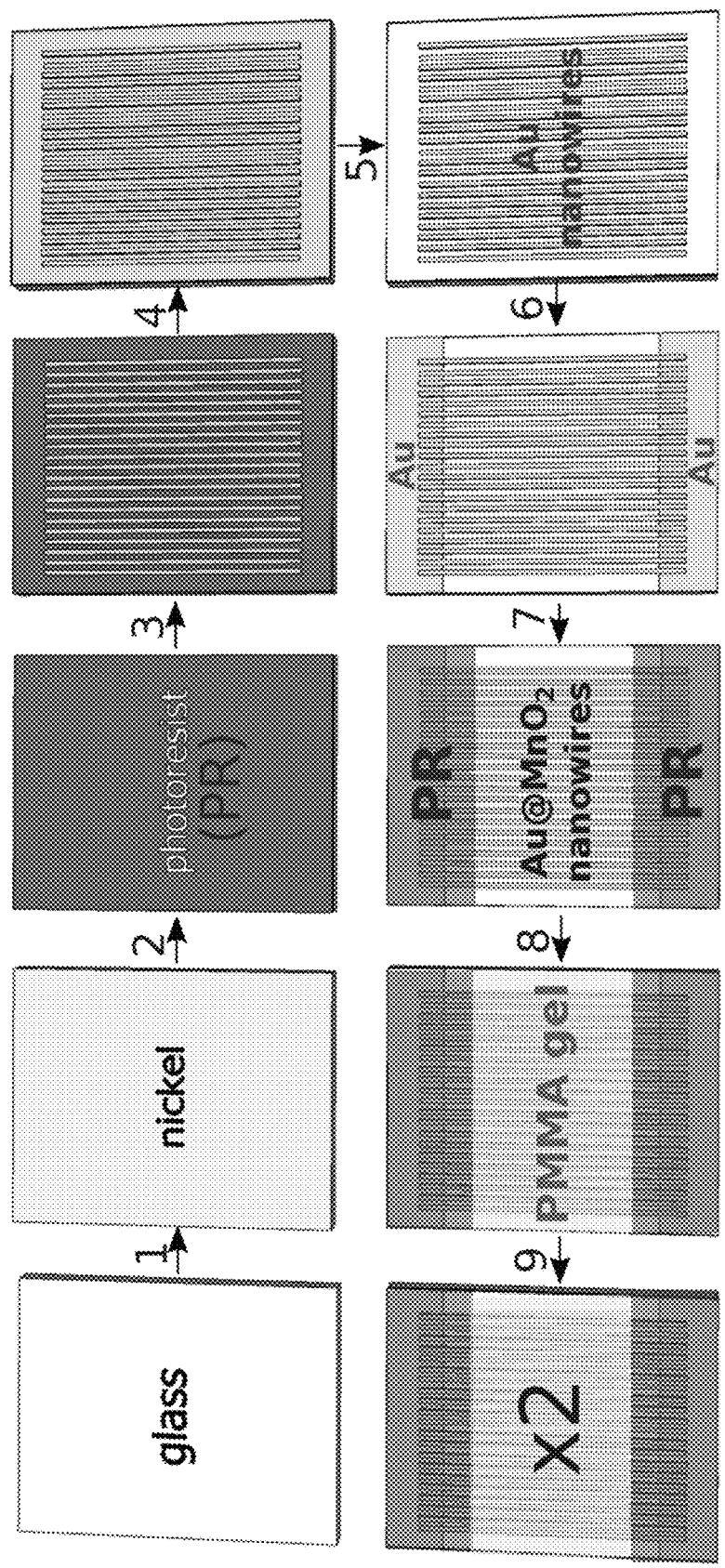
FIG. 4 is an exemplary fabrication process flow for a single, high density layer of 4000 Au@MnO2 nanowires, according to embodiments of the present disclosure.

FIG. 4 is an exemplary fabrication process flow for a single, high density layer of 4000 Au@δMnO2 nanowires, according to embodiments of the present disclosure. The nine-step process flow is for the fabrication of a single, high density layer of 4000 Au@MnO2 nanowires patterned at 5 μm pitch on glass, with dimensions as indicated in FIGS. 3A and 3B.

The Au@δ-MnO2 nanowires are prepared by using the LPNE process to prepare a linear array of gold nanowires 40 nm×200 nm (steps 1-5), and then electrodepositing δ-MnO2 (step 6) according to the following half-reaction:

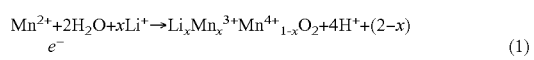

$$Mn^{2+}+2H_2O+xLi^+ \rightarrow Li_xMn_x^{3+}Mn^{4+}_{1-x}O_2+4H^++(2-x)e^- \quad (1)$$

This deposition process is carried out in an aqueous plating solution of 2 mM Mn(ClO4)2, 50 mM LiClO4. "x" is in the range from 0.0-0.05 for the as-deposited δ-MnO2 prepared at +0.60 V vs. MSE. As depicted in FIGS. 3B and 3C, the thickness, $d_{gel}=2d_{PR}$ where $d_{PR}$ is the thickness of the Shipley 1808 PR layer applied in FIG. 4 (step 7). This PR layer acts like a gasket to fix the total PMMA gel thickness and to provide a tight seal around the perimeter of the capacitor containing the gel and nanowires.

Starting with 2.5 cm×2.5 cm glass squares, a 40 nm layer of nickel is first thermally evaporated (FIG. 4, step 1). A positive photoresist layer (PR, Shipley, S1808) is deposited on the nickel film by spin-coating and soft-baked (90.0 for 30 min, step 2). This PR layer is photo patterned using a chromium/quartz contact mask (5 μm pattern array) using a 365 nm UV light source equipped with a shutter and alignment stage (Newport, 83210i-line, 2.3 s). After exposure, the pattern was developed for 25 sin developer solution (Shipley, MF-319, step 3). The exposed nickel was removed from exposed lines by etching with 0.8 M HNO3 for 5 minutes. This step removed exposed nickel and also produced an undercut at the edge of the PR. This undercut forms a horizontal trench, which is used to grow by electrodeposition of gold nanowires. Electrodeposition of gold was accomplished by immersing the lithographically patterned region into a gold plating solution (Clean Earth Solutions™). Gold nanowires, 40 nm °ø200 nm in cross-section, are deposited within this trench by potentiostatic growth at a potential of −0.9 V versus SCE (saturated calomel reference electrode) for 1000 s. After electrodeposition is complete, the PR layer was removed using acetone and the nickel layer was removed using nitric acid (step 4). A photolithography process then used to prepared gold electrical contacts (step 5). This is accomplished by first depositing a layer of PR to protect the gold nanowires. Gold contacts 60 nm in thickness are then evaporated onto the ends of the nanowires, and onto the PR mask covering the center of the gold nanowires as shown. After the gold contacts are deposited, all PR is removed from the surface (step 6) and a second PR layer is positioned to insulate the gold contacts, as indicated (step 7). Now, electrical contact is made to the gold contacts, and δ-MnO2 is electrodeposited on the exposed gold nanowires from an aqueous plating solution containing 2 mM Mn(ClO4)2, 50 mM LiClO4. MnO2 electrodeposition was carried out potentiostatically at +0.6 V versus MSE (saturated mercurous sulfate) reference electrode for a duration of 5 s-300 s, providing a MnO2 shell thickness in the range from 65 nm to 367 nm (step 7). After electrodeposition of the MnO2 shell, nanowires were rinsed with water, air-dried, and the entire device was baked at 190°

C. for 30 minutes to hard bake the PR insulator layers, rendering them impervious to propylene carbonate (PC). Finally, 100 μL of 1M LiClO4, 20 w/w % PMMA, PC gel electrolyte was spin-coated on the new complete device (step 8). The PMMA gel was heated to 115° C. on a hot plate for 10 minutes before spincoating in order to reduce its viscosity. Extra PMMA gel was removed from the device using doctor blading resulting in an even, uniform gel electrolyte layer inside the confines of the PR "frame" within which the nanowire array was located. This sequence completes one side of a capacitor sandwich.

A two-layer ("sandwich") capacitor can then be formed (step 9). Two of these devices are combined to form a complete sandwich capacitor with a total PMMA gel layer thickness of 2 μm. The two layers are pressed tightly together with the electrical contacts on opposite ends of the device with sufficient offset of the two glass layers (a few millimeters) to provide the ability to fix electrical connections. Sandwich capacitors are hermetically sealed to exclude moisture by sealing the edges with hot glue.

Figure 5A:
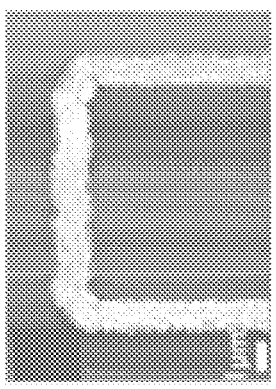
FIG. 5A is an SEM image of exemplary gold nanowires comprising a core of Au@δ-MnO2 core@shell nanowires, according to embodiments of the present disclosure.

FIG. 5A is an SEM image of exemplary gold nanowires comprising a core of Au@δ-MnO2 core@shell nanowires, according to embodiments of the present disclosure. FIG. 5E is an AFM image of exemplary gold nanowires comprising a core of Au@δ-MnO2 core@shell nanowires of FIG. 5A, according to embodiments of the present disclosure. A height versus distance amplitude trace is shown below the AFM image.

Figure 5B:
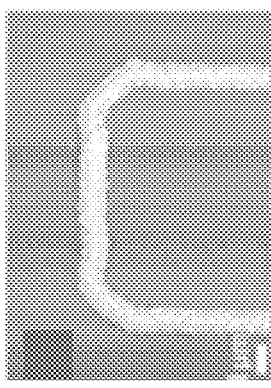
FIG. 5B is an SEM image of exemplary Au@δ-MnO2 core@shell nanowires, according to embodiments of the present disclosure.

FIG. 5B is an SEM image of exemplary Au@δ-MnO2 core@shell nanowires, according to embodiments of the present disclosure. FIG. 5F is an AFM image of exemplary Au@δ-MnO2 core@shell nanowires of FIG. 5B, according to embodiments of the present disclosure. A height versus distance amplitude trace is shown below the AFM image.

Figure 5C:
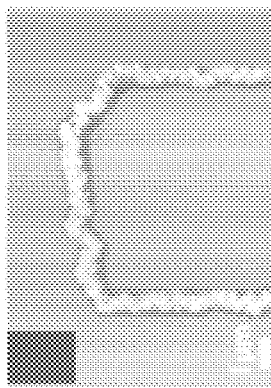
FIG. 5C is an SEM image of exemplary Au@δ-MnO2 core@shell nanowires, according to embodiments of the present disclosure.

FIG. 5C is an SEM image of exemplary Au@δ-MnO2 core@shell nanowires, according to embodiments of the present disclosure. FIG. 5G is an AFM image of exemplary Au@δ-MnO2 core@shell nanowires, of FIG. 5C according to embodiments of the present disclosure. A height versus distance amplitude trace is shown below the AFM image.

Figure 5D:
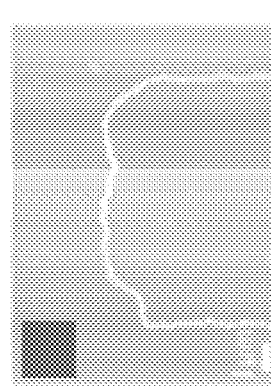
FIG. 5D is an SEM image of exemplary Au@δ-MnO2 core@shell nanowires, according to embodiments of the present disclosure.
Figure 5E:
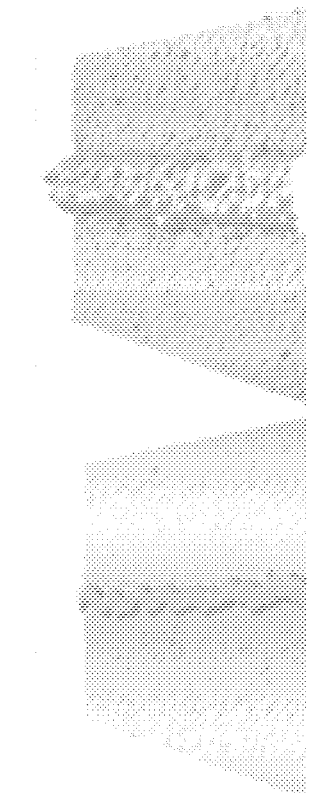
FIG. 5E is an AFM image of exemplary gold nanowires comprising a core of Au@δ-MnO2 core@shell nanowires, according to embodiments of the present disclosure.
Figure 5E:
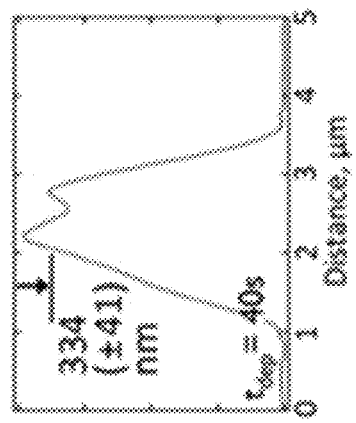
Figure 5F:
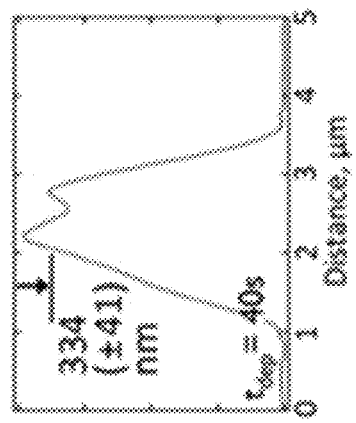
FIG. 5F is an AFM image of exemplary Au@δ-MnO2 core@shell nanowires, according to embodiments of the present disclosure.
Figure 5G:
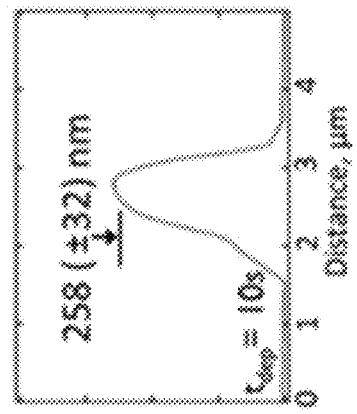
FIG. 5G is an AFM image of exemplary Au@δ-MnO2 core@shell nanowires, according to embodiments of the present disclosure.
Figure 5H:
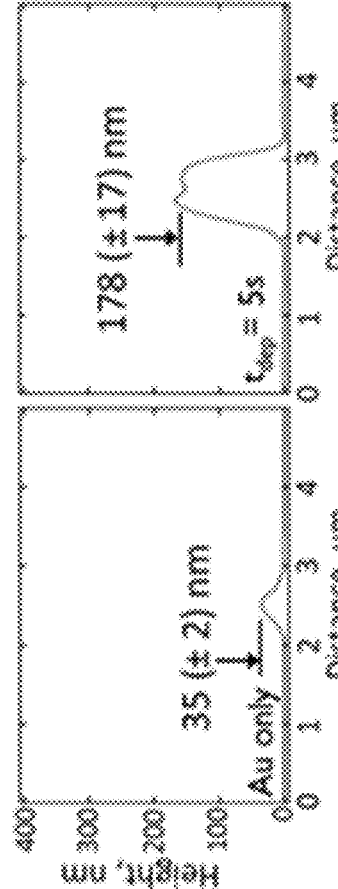
FIG. 5H is an AFM image of exemplary Au@δ-MnO2 core@shell nanowires, according to embodiments of the present disclosure.

FIG. 5D is an SEM image of exemplary Au@δ-MnO2 core@shell nanowires, according to embodiments of the present disclosure. FIG. 5H is an AFM image of exemplary Au@δ-MnO2 core@shell nanowires of FIG. 5D, according to embodiments of the present disclosure. A height versus distance amplitude trace is shown below the AFM image.

The embodiment of FIGS. 5B and 5F includes a Au@δ-MnO2 core@shell nanowire prepared by electrodepositing MnO2 onto the gold nanowire shown in FIG. 5A for 5 s.

The embodiment of FIGS. 5C and 5G include MnO2 deposited onto the gold nanowire of FIG. 5A for 10 s. The embodiment of FIGS. 5D and 5H include MnO2 deposited onto the gold nanowire of FIG. 5A for 40 s.

Figures 5I, 5J, 5K:
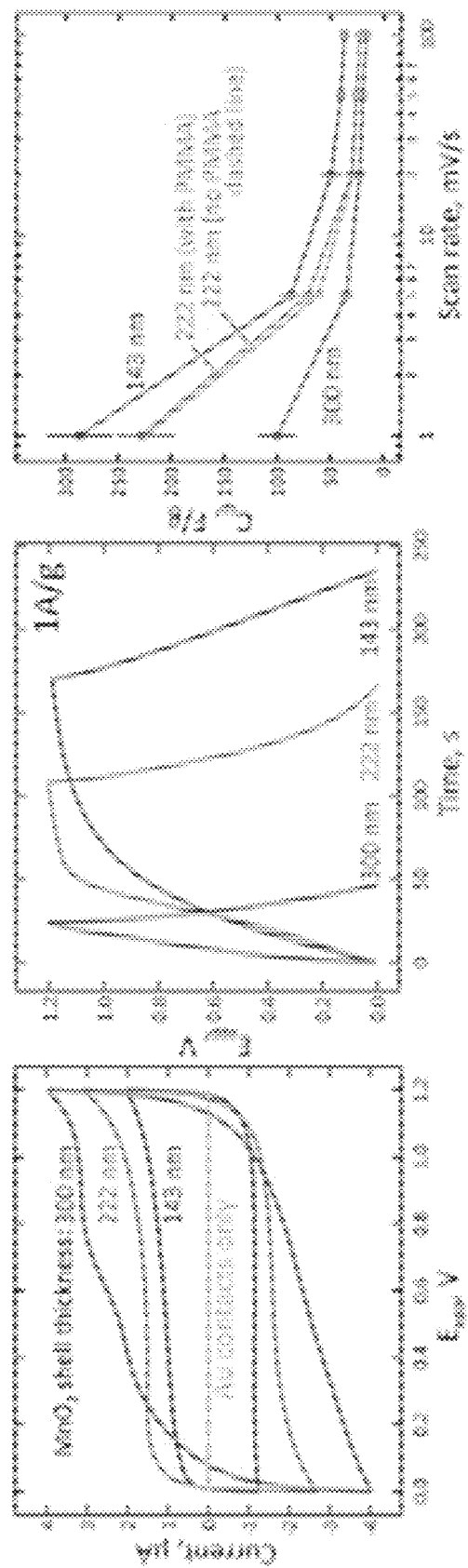
FIG. 5I illustrates cyclic voltammograms at 100 mV/s for exemplary single-layer capacitors prepared with three NmO2 thicknesses, according to embodiments of the present disclosure.
FIG. 5J illustrates galvanostatic charge/discharge curves for exemplary single-layer nanowire capacitors at 1 A/g, according to embodiments of the present disclosure.
FIG. 5K illustrates $C_{sp}$ versus scan rate for exemplary MnO2 nanowire arrays, according to embodiments of the present disclosure.

FIG. 5I illustrates cyclic voltammograms at 100 mV/s for exemplary single-layer capacitors prepared with three NmO2 thicknesses, according to embodiments of the present disclosure. FIG. 5j illustrates galvanostatic charge/discharge curves for exemplary nanowire capacitors at 1 A/g, according to embodiments of the present disclosure. FIG. 5K illustrates $C_{sp}$ versus scan rate for exemplary MnO2 nanowire arrays, according to embodiments of the present disclosure.

FIGS. 5I-5K illustrate charge storage performance for all nanowire single-layer capacitors composed of Au@MnO2 nanowires. All data here were acquired using the PMMA gel electrolyte except in the case of the 222 nm shell thickness, where data for the PMMA gel electrolyte and PC-only electrolyte are both shown FIG. 5K. In FIG. 5I, cyclic voltammograms at 100 mV/s are shown for single-layer capacitors prepared with three MnO2 shell thicknesses, 143, 222, and 300 nm, as indicated. In FIG. 5j total $C_{sp}$ values are 19, 34, and 56 F/g for tMnO2 values of 300, 222, and 143 nm, respectively. In FIG. 5K, for the 222 nm shell thickness, data for PMMA (solid green line) and no PMMA electrolytes (dashed green line) are compared. Error bars represent +/−σ for three as-prepared single-layer capacitors at each $t_{MnO2}$.

The properties of as-prepared single-layer capacitors having three $t_{MnO2}$ values (FIG. 5I, 5J) show that the total energy storage capacity increases with MnO2 shell thickness across the range from 143 to 300 nm. The mass-normalized specific capacitance, $C_{sp}$, (defined as $C_{sp}=Q/[(\Delta E)(mMnO2)]$, where Q is the integrated charge, $\Delta E=1.2$ V, and mMnO2 is the dry mass of the MnO2 varies inversely with tMnO2 (FIG. 5K). This trend demonstrates that the energy storage capacity of the thicker MnO2 shells is not as accessible as that of thinner shells, likely a consequence of the electrical resistance of the thicker MnO2 layers. Plots of $C_{sp}$ versus potential scan rate (FIG. 5K) for a particular MnO2 shell thickness show decreasing $C_{sp}$ with increasing scan rate from 1 to 100 mV/s. This behavior has been attributed to the influence of rate-limiting Li+ insertion and the solid-state diffusion of Li on charge storage, not only for MnO2 but also for other transition metal oxides. A key point, as demonstrated here for the 222 nm shell thickness (green traces, FIG. 5K), is that the addition of PMMA to the electrolyte produces no difference in the electrochemical behavior of freshly prepared nanowire capacitors and no diminution of $C_{sp}$. No penalty, in terms of energy storage performance, is imposed by the PMMA gel electrolyte.

Figures 6A, 6C, 6E, 6G:
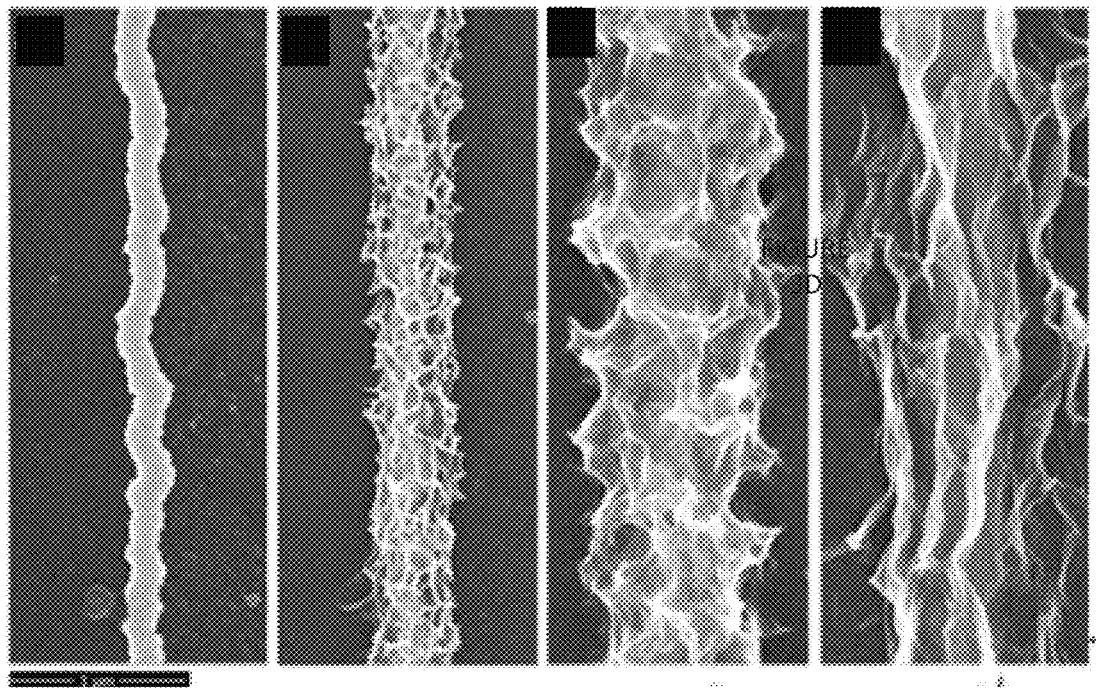
FIG. 6A is an SEM image of an exemplary uncoated gold nanowire comprising a core of exemplary Au@δ-MnO2 core@shell nanowires, according to embodiments of the present disclosure.
FIG. 6C is an SEM image of an exemplary Au@δ-MnO2 core@shell nanowire prepared by electrodepositing MnO2 onto a gold nanowire for a deposition time $t_{dep}$=5 s, according to embodiments of the present disclosure.
FIG. 6E is an SEM image of an exemplary Au@δ-MnO2 core@shell nanowire prepared by electrodepositing MnO2 onto a gold nanowire for a deposition time $t_{dep}$=40 s, according to embodiments of the present disclosure.
FIG. 6G is an SEM image of an exemplary Au@δ-MnO2 core@shell nanowire prepared by electrodepositing MnO2 onto a gold nanowire for a deposition time $t_{dep}$=300 s, according to embodiments of the present disclosure.
Figures 6B, 6D, 6F, 6H:
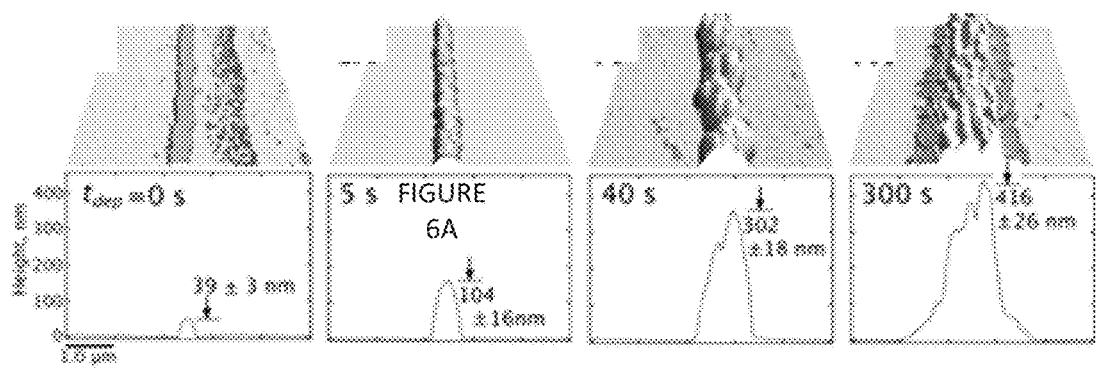
FIG. 6B is an AFM image of an exemplary uncoated gold nanowire comprising a core of exemplary Au@δ-MnO2 core@shell nanowires, according to embodiments of the present disclosure.
FIG. 6D is an AFM image of an exemplary Au@δ-MnO2 core@shell nanowire prepared by electrodepositing MnO2 onto a gold nanowire for a deposition time $t_{dep}$=5 s, according to embodiments of the present disclosure.
FIG. 6F is an AFM image of an exemplary Au@δ-MnO2 core@shell nanowire prepared by electrodepositing MnO2 onto a gold nanowire for a deposition time $t_{dep}$=40 s, according to embodiments of the present disclosure.
FIG. 6H is an AFM image of an exemplary Au@δ-MnO2 core@shell nanowire prepared by electrodepositing MnO2 onto a gold nanowire for a deposition time $t_{dep}$=300 s, according to embodiments of the present disclosure.

FIG. 6A is an SEM image of an exemplary uncoated gold nanowire comprising a core of exemplary Au@δ-MnO2 core@shell nanowires, according to embodiments of the present disclosure. FIG. 6B is an AFM image of an exemplary uncoated gold nanowire comprising a core of exemplary Au@δ-MnO2 core@shell nanowires (of FIG. 6A,) according to embodiments of the present disclosure. A height versus distance amplitude trace is shown below the AFM image. FIGS. 6A and 6B include an uncoated gold nanowire comprising the core of Au@δ-MnO2 core@shell nanowires.

FIG. 6C is an SEM image of an exemplary Au@δ-MnO2 core@shell nanowire prepared by electrodepositing MnO2 onto a gold nanowire for a deposition time $t_{dep}=5$ s, according to embodiments of the present disclosure. FIG. 6D is an AFM image of an exemplary Au@δ-MnO2 core@shell nanowire prepared by electrodepositing MnO2 onto a gold nanowire for a deposition time $t_{dep}=5$ s (of FIG. 6C), according to embodiments of the present disclosure. A height versus distance amplitude trace is shown below the AFM image.

FIG. 6E is an SEM image of an exemplary Au@δ-MnO2 core@shell nanowire prepared by electrodepositing MnO2 onto a gold nanowire for a deposition time $t_{dep}=40$ s, according to embodiments of the present disclosure. FIG. 6F is an AFM image of an exemplary Au@δ-MnO2 core@shell nanowire prepared by electrodepositing MnO2 onto a gold nanowire for a deposition time $t_{dep}=40$ s (of FIG. 6E), according to embodiments of the present disclosure. A height versus distance amplitude trace is shown below the AFM image.

FIG. 6G is an SEM image of an exemplary Au@δ-MnO2 core@shell nanowire prepared by electrodepositing MnO2 onto a gold nanowire for a deposition time $t_{dep}=300$ s, according to embodiments of the present disclosure. FIG. 6H is an AFM image of an exemplary Au@δ-MnO2 core@shell nanowire prepared by electrodepositing MnO2 onto a gold nanowire for a deposition time $t_{dep}$=300 s (of FIG. 6G), according to embodiments of the present disclosure. A height versus distance amplitude trace is shown below the AFM image.

The mean nanowire heights (indicated at bottom in each of the plots below AFM images in FIGS. 6A-6G) equal the sum of the MnO2 shell thickness and the gold nanowire height (39+/−3 nm). δ-MnO2 shell thicknesses, $d_{MnO2}$=65 (+/−16) nm, 263 (+/−18) nm, and 367 (+/−26) nm.

FIG. 6I illustrates voltammograms [inset] at scan rates from 1 mV/s to 500 mV/s across $V_{max}$=1.2V and a plot of $C_{sp}$ versus scan rate from the data, according to embodiments of the present disclosure. FIG. 6J illustrates $C_{sp}$ at 100 mV/s up to 100,000 cycles according to embodiments of the present disclosure. FIG. 6J illustrates a showing of 10-12 F/g over a 5 week interval during which the data were collected.

These figures illustrate that the performance of the two-layer sandwich capacitor at $V_{max}$=1.2 V, with respect to $C_{sp}$ and cycle stability, is indistinguishable from that of single layer, interdigitated nanowire capacitor of FIGS. 5A-5K.

For example, the two-layer sandwich capacitor of FIG. 6I with dMnO2=263 nm ($t_{dep}$=40 s) shows a maximum $C_{sp}$ at 1 mV/s of 335 F/g which corresponds to a half-cell capacity of four times this value or 1340 F/g—approximately equal to the expected theoretical Faradaic capacity of MnO2. At more rapid charge/discharge rates of 100 mV/s, $C_{sp}$ is 10-12 F/g, also as previously observed. Whereas the cycle stability in liquid PC electrolyte is normally 4000-8000 cycles for single layer capacitor systems, here cycle stability is obtained to at least 100,000 scans with an average coulombic efficiency (C.E) of 96% (FIG. 6J). These data demonstrate that the new challenges imposed by the high-density two-layer sandwich capacitor architecture—particularly the 2 μm PMMA electrolyte thickness—is not detrimental either to $C_{sp}$ or cycle stability. These conclusions apply to $V_{max}$=1.2 V. As already indicated above, $V_{max}$ values for symmetrical MnO2 capacitors are typically lower than this, in the range from 0.80 V to 1.0V. A larger Vmax is desirable, of course, because the total energy is proportional to $V_{max}^2$:

$$E=(\tfrac{1}{2})CV_{max}^2 \quad (2)$$

FIGS. 7A and 7B illustrate cycle stability of Au@δ-MnO2 core@shell single-layer nanowire capacitors. FIGS. 7A and 7B illustrate $C_{sp}$ versus cycles for various MnO2 shell thicknesses as indicated, according to embodiments of the present disclosure. Also, plotted (top) is the Coulombic efficiency for the 222 nm MnO2 shell thickness. Other shell thicknesses were virtually identical. FIG. 7B includes details showing the first 20,000 cycles in FIG. 7A. In liquid PC electrolyte, cycle lifetimes of 2000-8000 cycles are obtained for three single-layer capacitors (FIGS. 7A,7B). This stability is in the range of values reported recently for Au@δ-MnO2 core@shell nanowire capacitors in dry acetonitrile electrolyte. Dramatically greater cycle stability of $C_{sp}$ is seen in the PMMA gel electrolyte for all MnO2 shell thicknesses (FIG. 7A,7B). Stability to >100 k cycles is demonstrated for single-layer capacitors containing nanowires with tMnO2=300 and 222 nm, whereas for tMnO2=143 nm, cycle stability to >200 000 cycles is demonstrated. In all cases, these cycling experiments in PMMA gel were terminated before a fade of $C_{sp}$ equaling 10% was observed. A slow and steady increase in $C_{sp}$ across 100,000 cycles was observed for $t_{MnO2}$=222 nm and for over 200 000 cycles for the 143 nm nanowires, while tMnO2=300 nm showed increases in $C_{sp}$ for 80 000 cycles, followed by a fading of the $C_{sp}$ by ~5%. To the applicant's knowledge, this level of cycle stability has not previously been reported for nanowire-based capacitor or battery electrodes that have a significant insertion capacity in addition to double-layer charge storage (as shown in Table 1).

TABLE 1

All Single-Layer Nanowire Capacitors with Field-Leading Cycle Stability
Table I. All Nanowire Capacitors with Field-Leading Cycle Stability

| anode | cathode | electrolyte[a] | $C_{sp}^{b}$ | cycles before $C_\phi$ fade |
|---|---|---|---|---|
| V2O5 | V2O5 | LiCl/PVA | 0.25 F/cm² | 1000 |
| LiMnO2 | PEDOT | acetonitrile/PMMA | 80 F/g | 1250 |
| KMnO3 | KMnO2 | PVA/H2SO4 | 14 F/cm² | 10 000 |
| Mn2O4 | Mn2O4 | PC/PMMA | 9 F/cm³ | 30 000 |
| pCNF5/G | pCNF3/G | PVA/H2SO4 | 100 F/g | 5000 |
| RGMA | RGMA | ionic liquid | 2.72 F/cm³ | 6000 |
| MnO2/Au | MnO4/Au | PVA/H2SO4 | 32.8 F/cm³ | 15 000 |
| LiMnO2 | LiMnO2 | PC/PMMA | 12-56 F/g | >100 000->200 000 |

[a]Abbreviations: PEDOT—poly(ethylenedioxythiophene); PVA—poly(vinyl alchohol); PMMA—poly(methyl methacrylate); PC—propylene carbonate; RGMA—graphene oxide/MnO2/AgNW; pCNFs/G—porous carbon nanofibers/ultrathin graphite.
[b]Specific capacity, in specified units.

FIG. 7C illustrates CVs at 100 mV/s for an exemplary 222 nm MnO2 shell thickness, according to embodiments of the present disclosure. The data is shown for cycle 1 and cycle 100,000. FIG. 7D illustrates $C_{sp}$ versus scan rate for an exemplary 222 nm MnO2 shell thickness, according to embodiments of the present disclosure. The data was acquired at 6000, 40,000, 75 000, and 95 000 cycles, as indicated.

The slow increase in $C_{sp}$ across the first 20,000 cycles seen for capacitors in the gel electrolyte is curious as this behavior is not seen in liquid PC or acetonitrile electrolytes. PMMA gel was applied to dried Au@δ-MnO2 core@shell nanowires in this study. The observed "activation" of $C_{sp}$ involves the slow permeation of the nanoporous MnO2 shell by the viscous PMMA gel electrolyte over a period of weeks. If this permeation process occurs, as the wetting of the interior of the porous MnO2 layer proceeds, both insertion and noninsertion components of the capacity increase. For the $t_{MnO2}$=222 nm device, the resulting increase in $C_{sp}$ across 100 000 cycles is readily apparent in the cyclic voltammograms (FIG. 7C).

$C_{sp}$ versus scan rate plots (FIG. 7D) show the retention of high $C_{sp}$ values of 200 F/g at slow scan rates after 95 000 cycles. The corresponding half-cell capacity is four times this full cell value, or 800 F/g, in the range of values seen for MnO2 nanowire-based electrodes in our prior work. These data confirm that the insertion capacity of the as-prepared MnO2 is retained over the course of these ultralong experiments, lasting several months. The retention of insertion-based capacity is also supported by a deconvolution of the insertion and noninsertion components of $C_{sp}$. Single-layer nanowire capacitors operating in PMMA gel electrolyte exhibited a good average Coulombic efficiency (C.E.) of ~96% over >100 k cycles. As shown for $t_{MnO2}$=143 nm nanowires in FIG. 7A, a C.E. of ~98% is measured after 30-40 kcycles. However, much lower C.E. values of 60% are seen initially, and the C.E. increases montonically over the first 20 000 cycle. Although the origin of the low values of C.E. measured initially in PMMA gel electrolyte is not apparent, low C.E. values are not seen in liquid PC electrolyte, suggesting that this phenomenon may also be related to the slow wetting of the porous MnO2 layer by PMMA, already alluded to above.

For MnO2 devices, capacity fade has been attributed to dissolution of the MnO2, caused by Mn3+ disproportionation at negative potentials. Mechanical fatigue and fracture of the MnO2, caused by the strain imposed by ion insertion/deinsertion, is a second mechanism contributing to capacity fade. In an attempt to understand how the PMMA gel confers stability on Au@MnO2 core@shell nanowires, these nanowires were examined by SEM before and after cycling in PC and PMMA gel electrolytes (FIGS. 8A-8J). FIGS. 8A-8J illustrate SEM analysis of Au@δ-MnO2 nanowires before and after cycling.

Two samples of as-prepared Au@MnO2 nanowires with a 222 nm shell thickness appear identical in these images (FIGS. 8A-8D). In a liquid PC electrolyte after 4000 charge/discharge cycles, short-range (100-500 nm) loss of MnO2 from the shell is readily apparent along the entire length of all of the nanowires in the single-layer capacitor (FIGS. 8E and 8F). The same single-layer capacitor cycled 100,000 cycles in the PMMA electrolyte, in contrast, shows no reduction in the shell diameter and no short-range losses of MnO2 (FIGS. 8G and 8H).

Figures 8A, 8B, 8C, 8D, 8E, 8F, 8G, 8H:
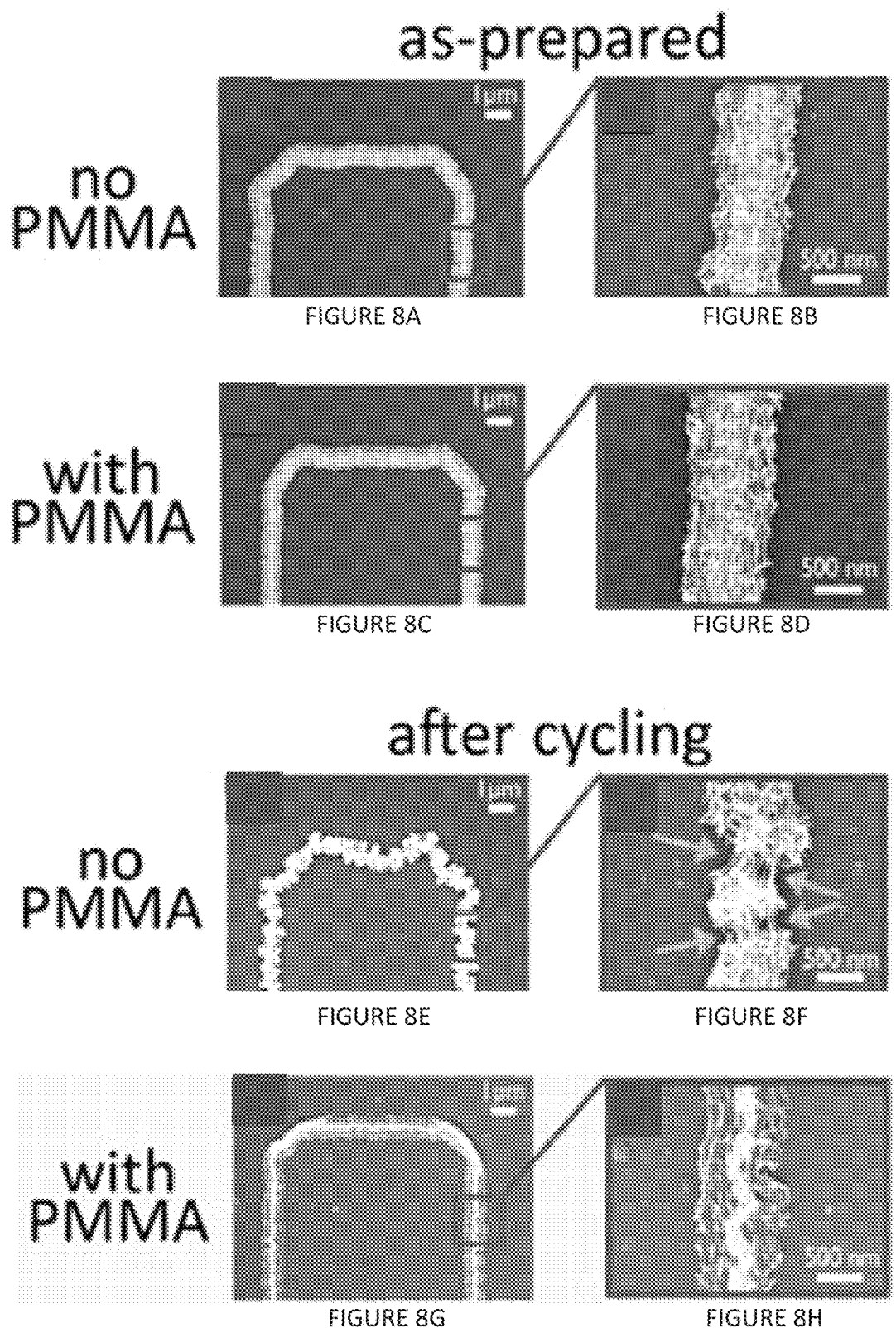
FIG. 8A is an SEM image at low magnification of an exemplary Au@δ-MnO2 nanowire with shells of thickness 220 nm, according to embodiments of the present disclosure.
FIG. 8B is an SEM image at higher magnification of the exemplary Au@δ-MnO2 nanowires with shells of thickness 220 nm of FIG. 8A, according to embodiments of the present disclosure.
FIG. 8C is an SEM image at low magnification of another exemplary Au@δ-MnO2 nanowire with shells of thickness 220 nm, according to embodiments of the present disclosure.
FIG. 8D is an SEM image at higher magnification of the exemplary Au@δ-MnO2 nanowires with shells of thickness 220 nm of FIG. 8C, according to embodiments of the present disclosure.
FIG. 8E is an SEM image at low magnification of the exemplary Au@δ-MnO2 nanowire with shells of thickness 220 nm of FIG. 8A after 4000 charge/discharge cycles, according to embodiments of the present disclosure.
FIG. 8F is an SEM image at higher magnification of the exemplary Au@δ-MnO2 nanowires with shells of thickness 220 nm of FIG. 8A after 4000 charge/discharge cycles, according to embodiments of the present disclosure.
FIG. 8G is an SEM image at low magnification of the exemplary Au@δ-MnO2 nanowire with shells of thickness 220 nm of FIG. 8B after 100,000 charge/discharge cycles, according to embodiments of the present disclosure.
FIG. 8H is an SEM image at higher magnification of the exemplary Au@δ-MnO2 nanowires with shells of thickness 220 nm of FIG. 8B after 100,000 charge/discharge cycles, according to embodiments of the present disclosure.

FIG. 8A is an SEM image at low magnification of an exemplary Au@δ-MnO2 nanowire with shells of thickness 220 nm, according to embodiments of the present disclosure. FIG. 8C is an SEM image at low magnification of another exemplary Au@δ-MnO2 nanowire with shells of thickness 220 nm (of FIG. 8A), according to embodiments of the present disclosure.

FIG. 8B is an SEM image at higher magnification of the exemplary Au@δ-MnO2 nanowires with shells of thickness 220 nm of FIG. 8A, according to embodiments of the present disclosure. FIG. 8D is an SEM image at higher magnification of the exemplary Au@δ-MnO2 nanowires with shells of thickness 220 nm of FIG. 8C, according to embodiments of the present disclosure.

FIG. 8E is an SEM image at low magnification of the exemplary Au@δ-MnO2 nanowire with shells of thickness 220 nm of FIG. 8A after 4000 charge/discharge cycles, according to embodiments of the present disclosure. FIG. 8F is an SEM image at higher magnification of the exemplary Au@δ-MnO2 nanowires with shells of thickness 220 nm of FIG. 8B after 4000 charge/discharge cycles, according to embodiments of the present disclosure. The short-range loss of MnO2, from 100 to 500 nm domains, is readily apparent in these images (green arrows).

FIG. 8G is an SEM image at low magnification of the exemplary Au@δ-MnO2 nanowire with shells of thickness 220 nm of FIG. 8C after 100,000 charge/discharge cycles, according to embodiments of the present disclosure. FIG. 8H is an SEM image at higher magnification of the exemplary Au@δ-MnO2 nanowires with shells of thickness 220 nm of FIG. 8D after 100,000 charge/discharge cycles, according to embodiments of the present disclosure. In contrast to FIGS. 8E and 8F, using the PMMA gel electrolyte, no shell loss is observed in this case. In PC without PMMA, short-range loss of MnO2 (FIGS. 8E and 8F) precedes long-range loss of the MnO2 shell over a length scale of microns.

Figures 8I, 8J:
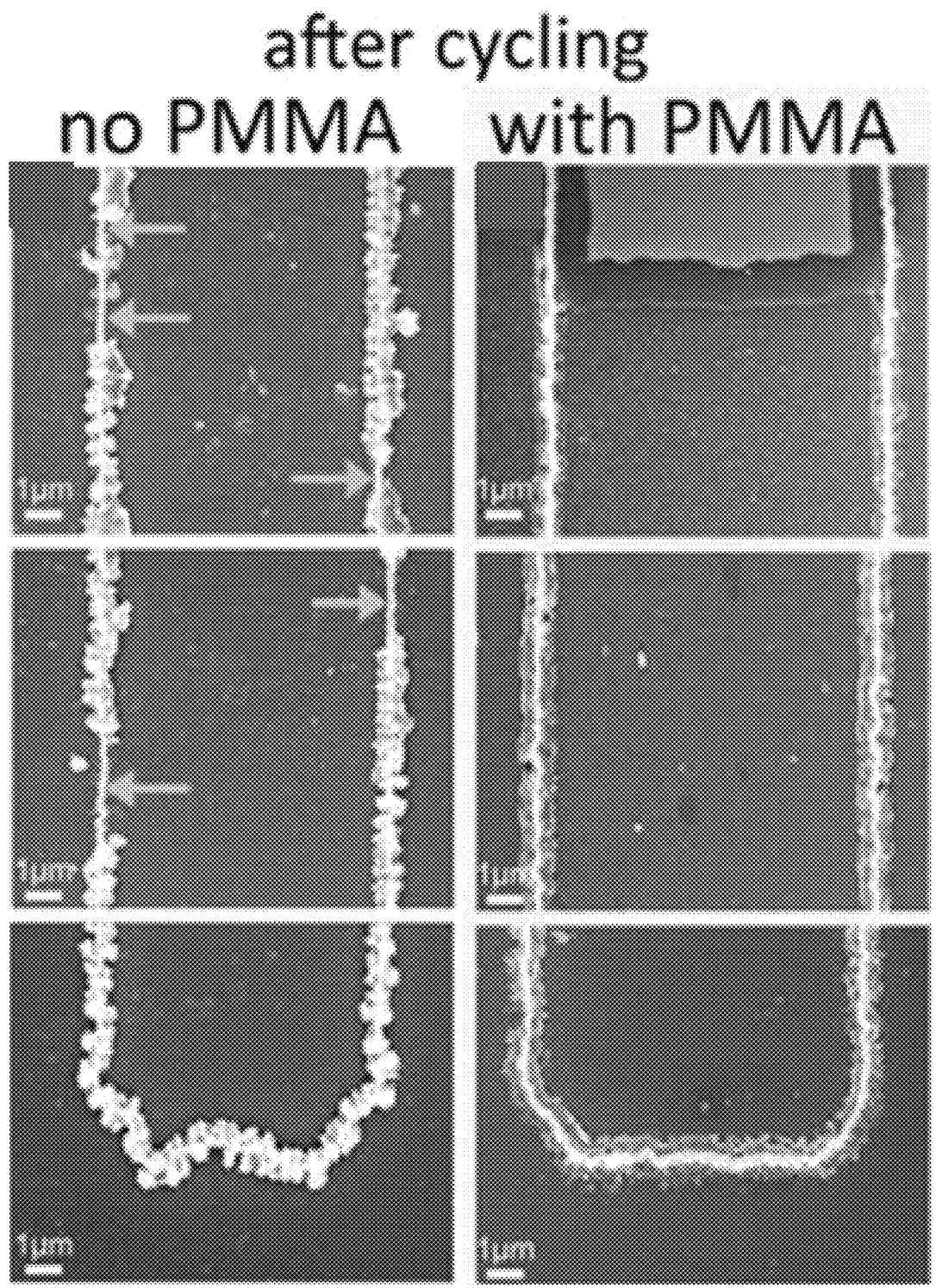
FIG. 8I is an SEM image of a single nanowire loop of an exemplary Au@δ-MnO2 core@shell single-layer structure without PMMA gel electrolyte, according to embodiments of the present disclosure.
FIG. 8J is an SEM image of a single nanowire loop of an exemplary Au@δ-MnO2 core@shell single-layer structure with PMMA gel electrolyte, according to embodiments of the present disclosure.

FIG. 8I is an SEM image of a single nanowire loop of an exemplary Au@δ-MnO2 core@shell structure without PMMA gel electrolyte, according to embodiments of the present disclosure.

FIG. 8J is an SEM image of a single nanowire loop of an exemplary Au@δ-MnO2 core@shell structure with PMMA gel electrolyte, according to embodiments of the present disclosure. These SEM images of a single nanowire loop of a Au@δ-MnO2 core@shell structure without PMMA (FIG. 8I) and with PMMA (FIG. 8J) document the loss of the MnO2 shell (green arrows) in the absence of the PMMA.

The short-range loss of MnO2 is augmented by loss of MnO2 on a micron scale in other sections of the same single-layer capacitors, as shown in FIGS. 8I and 8J. Here, 1-5 μm sections of the δ-MnO2 shell have been excised from the core-shell nanowire in multiple places, revealing the underlying gold nanowire current collector (FIG. 8I). This mode of shell loss is also not evidenced in SEMs of Au@δ-MnO2 nanowires cycled 100 k cycles in PMMA gel electrolyte. The short-range (FIGS. 8E and 8F) and long-range (FIG. 8I) losses of the MnO2 shell are collectively expected to reduce $C_{sp}$ qualitatively, as observed in these experiments. These images implicate a two-stage mechanism for irreversible capacity loss in Au@δ-MnO2 nanowires that involves short-range MnO2 loss, observed to occur along the entire length of the core-shell nanowire, followed by micron range separation of the entire "skeletonized" MnO2 shell from the gold nanowire current collector.

Mechanical confinement of the MnO2 shell by the viscous, semisolid PMMA gel seems to be one mechanism by which fracture and long-range loss of MnO2 (FIG. 8I) is averted. The high viscosity and elasticity of the PMMA gel tends to prevent separation of MnO2 from the current collector while remaining transparent to fluxes of Li+ involved in insertion and deinsertion. However, any mechanical stabilization conferred by the gel clearly is not the whole story: For nanowires cycled in the PMMA gel electrolyte, fewer fractures of the MnO2 shell are found, suggesting that the PMMA tends to function as a plasticizer, increasing the fracture toughness of the shell.

A preliminary Raman microprobe study of as-prepared and cycled Au@δ-MnO2 nanowires shows no difference between the Raman spectra of Au@δ-MnO2 nanowires cycled in liquid PC and PMMA gel. Embrittlement of the MnO2 shell, revealed by a stiffening of Mn—O modes, would predispose the shell to fracture and mechanical loss induced by the strain imparted by ion insertion/deinsertion.

Chemicals and Materials. Nickel and gold pellets (5 N purity, Kurt J. Lesker Co.) were used for the preparation by thermal evaporation of ultrathin metal layers of FIGS. 8A-8J. Manganese perchlorate hydrate (Mn(ClO4)2.H2O, 99%), poly(methyl methacrylate) (PMMA, Mw=120 000 g/mol by GPC, 99.99%), and lithium perchlorate (LiClO4, 99.99%) were used as received from Sigma-Aldrich. Acetone, nitric acid, and propylene carbonate (PC, 99.7%) were used as received from Fisher (ACS Certified). PC was stored in a glovebox until use.

Au@δ-MnO2 Nanowire Fabrication. The fabrication of all single-layer nanowire capacitors using a single layer of arrays of Au@δ-MnO2 core@shell nanowire arrays was accomplished using the LPNE processes.

Preparation of the Gel Electrolyte. The 1.0 M LiClO4, 20 (w/w) %, PMMA, and PC gel electrolyte was prepared by adding 1.6 g (20 wt %) of PMMA to 5 mL of 1.0 M LiClO4 in dry PC. The mixture was dissolved by vigorous stirring at 115 C. In a desiccator, the mixture slowly cooled to room temperature and transformed to the gel state.

Electrochemical Characterization. Electrodeposition was accomplished using a three-electrode electrochemical cell with Princeton Applied Research 2263 and 2273 potentiostats using an SCE reference electrode. Prior to each measurement, the cell holder was presaturated with N2 gas and sealed with parafilm to eliminate moisture in air.

Structural Characterization. Scanning electron micrographs were acquired using a FEI Magellan 400 L XHR scanning electron microscope operating at 10 keV. Before imaging, samples were sputter-coated with ~2 nm of iridium. AFM images and amplitude traces were acquired using an Asylum Research, MFP-3D AFM equipped with Olympus AC160TS tips in laboratory ambient air.

Raman Spectroscopy. Raman spectra were collected at room temperature using a Renishaw inVia Raman microscope equipped with the EasyConfocal optical system (spatial resolution: 1 μm) and green laser (wavelength of 532 nm and 22 mW laser power). WiRE 3 software was used to acquire the data and images. Other Raman measurement specifications are the objective lens 50×, 0.5% laser power on the sample, laser exposure time of 120 s.

Charge storage performance for two-layer Au@-MnO2 nanowire sandwich capacitors is illustrated in FIGS. 9A-9F. All data here was acquired using the PMMA gel electrolyte.

FIG. 9A illustrates cyclic voltammograms (CVs) at 200 mV/s for nanowires prepared with a MnO2 deposition time, $t_{dep}=5$ s (dMnO2=65 nm), according to embodiments of the present disclosure. $V_{max}$ values of 1.2 V, 1.5 V, and 1.8 V are shown as indicated. FIG. 9B illustrates CVs for nanowires at 200 mV/s for $V_{max}=1.2V$, according to embodiments of the present disclosure. Shown at all three $t_{dep}$ values: 5 s, 40 s, and 300 s. FIG. 9C illustrates CVs for nanowires at 200 mV/s for $V_{max}=1.8V$, according to embodiments of the present disclosure. Shown at all three $t_{dep}$ values: 5 s, 40 s, and 300 s.

Cyclic voltammograms for sandwich capacitors with nanowires prepared with dMnO2=65 nm (FIG. 9A) show that some irreversible oxidation current is observed as $V_{max}$ is increased from 1.2 V to 1.5 V and, especially, to 1.8 V. This oxidation is not seen for any MnO2 shell thickness for scans to 1.2 V (FIG. 9B), but it is observed for all shell thicknesses at 1.8 V (FIG. 9C). This suggests that an irreversible oxidation is occurring in the capacitor when it is polarized above 1.5 V. Surprisingly, it is demonstrated this irreversible electrochemistry does not compromise the cycle stability of these systems.

By definition, $C_{sp}=Q=(VmaxmMnO2)$, where Q is the charge stored, and mMnO2 is the total mass of MnO2 in the capacitor. For a solid state, parallel plate capacitor, $C_{sp}$ is independent of $V_{max}$ but this is not what we observe. Instead, $C_{sp}$ increases by a factor up to 2.0 as $V_{max}$ is increased from 1.2 V to 1.8 V. This can be seen most easily in the cyclic voltammograms of FIG. 9A. The current envelope, $i_c(E)$, at a potential E, is given by: $i_c(E)=2C(E)v$ where $i_c(E)$ is the total anodic plus cathodic charging/discharging current at E, C(E) is the capacitance at E, and v is the potential scan rate. From FIG. 9A, it is apparent value of ic(E), and therefore C(E), approximately doubles as $V_{max}$ increases from 1.2 V to 1.8 V. This increased in C(E) not only increases $C_{sp}$, it also leads to an increase in energy beyond that expected for the increase in $V_{max}$ alone in Eq 2. Because of the influence of $V_{max}$ on C(E), we measure a 5-6-fold increase in energy at $V_{max}=1.8$ V compared with 1.2 V, instead of the 2.25-fold increase predicted by Eq. 2 (Table 3). An increase in C(E) and Csp with Vmax can occur because charge is derived from quasi-reversible Faradaic electrochemistry of the Mn centers having redox E° values that are distributed in potential across these voltage windows as a consequence of the inhomogeneity of the environments for Mn centers within the disordered MnO2 shell.

TABLE 2

Energy Storage Metrics for Au@δ-MnO2 Nanowire Arrays in Single Layer and Two-Layer Sandwich Capacitors

| Device Architecture | NW pitch (μm) | $d_{MnO2}{}^a$ (nm) | $V_{max}{}^b$ (V) | $C_{total}{}^c$ (μF) | Vol. $C_{sp}{}^d$ (mF/cm³) | Literature Reference |
|---|---|---|---|---|---|---|
| single layer | 25 | 143 | 1.2 | 0.45 | 0.25 | 2 |
| " | | 222 | 1.2 | 0.90 | 0.50 | " |
| " | | 300 | 1.2 | 2.5 | 0.85 | " |
| sandwich | 5 | 65 (±16) | 1.8 | 57 | 130 | this work |
| " | | 263 (±18) | 1.2 | 38 | 62 | " |
| " | | 263 (±18) | 1.8 | 73 | 180 | " |
| " | | 367 (±26) | 1.8 | 230 | 510 | " |

$^a d_{MnO2}$ = Thickness of the δ-MnO$_2$ shell as measured by AFM.
$^b V_{max}$ = Maximum applied voltage.
$^c C_{total}$ = Total capacitance = $Q_{total}/V_{max}$.
$^d$ Vol. $C_{sp}$ = Volumetric capacitance = $C_{total}$/PMMA gel volume, excluding the volume of the glass slides.

FIG. 9D illustrates $C_{sp}$ versus scan rate for MnO2 nanowire arrays with a deposition time of $t_{dep}=5$ s, according to embodiments of the present disclosure. Corresponding δ-MnO2 shell thickness, $d_{MnO2}$ is 65 nm. FIG. 9E illustrates $C_{sp}$ versus scan rate for MnO2 nanowire arrays with a deposition time of $t_{dep}=40$ s, according to embodiments of the present disclosure. Corresponding δ-MnO2 shell thickness, $d_{MnO2}$ is 263 nm. FIG. 9F illustrates $C_{sp}$ versus scan rate for MnO2 nanowire arrays with a deposition time of $t_{dep}=300$ s, according to embodiments of the present disclosure. Corresponding δ-MnO2 shell thickness, $d_{MnO2}$ is 367 nm.

Thinner MnO2 shells on these Au@δ-MnO2 nanowires correlate with improved rate capability (FIG. 9D-9F), just as previously observed. At 1 mV/s, both the $t_{dep}=5$ s (65 nm) and 40 s (263 nm) samples produce $C_{sp}=300-325$ F/g which translates into a halfcell $C_{sp}$ value of four times this value, or 1200 F/g-1300 F/g; approximately equaling the theoretical Faradaic capacity of MnO2. The thickest MnO2 shell obtained using $t_{dep}=300$ s (367 nm), does not achieve this maximum value. At higher scan rates, $C_{sp}$ rapidly declines, but thinner MnO2 shells show better retention of $C_{sp}$ at high scan rates (FIG. 9D-9F). This behavior has been attributed to the influence of rate-limiting Li$^+$ insertion and solid-state diffusion of Li on charge storage, not only for MnO2 but also for other transition metal oxides. These $C_{sp}$ versus scan rate data also show that while a larger MnO2 shell does yield a higher total capacity (Table 2), $C_{sp}$ moves in the opposite direction, becoming higher with decreasing MnO2 thickness (FIGS. 9D-9F). This trend, also documented previously, demonstrates that the accessibility of MnO2 energy storage capacity decreases with increasing shell thickness. The high electrical resistivity of MnO2 provides one rationalization for this. A second contributing factor is the possibility that Mn centers, buried deep within crystalline MnO2, may become electrically isolated when the transport of charge-compensating ions to these centers is impeded.

TABLE 3

Recent Literature Metrics for Asymmetric and Symmetric MnO2 Capacitors

| +/− Electrode | Electrolyte[a] | Vol. $C_{sp}$[b] (mF/cm$^3$) | Energy Wh/kg[c] ($V_{max}$) | Cycles At Fade[d] |
|---|---|---|---|---|
| Assymmetrical | | | | |
| MnO$_2$/AC | Aq. LiOH | n.a | n.a (0.70 V) | 1500 |
| G-MnO$_2$/G | Aq. Na$_2$SO$_4$ | n.a | 6-21 (1.8 V) | 1000 |
| G-MnO$_2$/G | Aq. Na$_2$SO$_4$ | n.a | 7-21 (0.80 V) | 5000 |
| H-TiO$_2$@MnO$_2$/ H-TiO$_2$@C | LiCl/PVA gel | 650 | n.a (1.8 V) | 5000 |
| CNT-MnO$_2$/CNT | Aq. KOH | 13,000-30,000 | n.a (1.5 V) | 10k |
| Ni(OH)$_2$, MnO$_2$@CNT/C | Aq. KOH | n.a | 40-105 (1.6 V) | 3000 |
| MnO$_2$ nanotubes/AC | Aq. Na$_2$SO$_4$ | n.a | 4-23 (1.80 V) | 3000 |
| NCTs/ANPDM/C | Aq. Na$_2$SO$_4$ | 80-130 | 30-50 (0.80 V) | 5000 |
| MnO$_2$, CNT/AC | Aq. Na$_2$SO$_4$ | n.a | 8-27 (1.70 V) | 4000 |
| Symmetrical | | | | |
| MnO$_2$, CNT | Aq. Na$_2$SO$_4$ | 140-175 | 32-35 (0.80 V) | 10k |
| MnO$_2$@MWCNT | PVA, LiCl, ethanol | 8,000-11,000 | n.a. (1.0 V) | 15k |
| R-MnO$_2$, CNT textile | PC: PMMA | n.a. | 3-17 (0.40 V) | 50k |
| Au@δ-MnO$_2$ $d_{MnO2}$ = | | | | |
| 65 nm | PC: PMMA | 130 | 37 (1.8 V) | >100k |
| 263 nm | " | 180 | 16 (1.8 V) | " |
| 367 nm | " | 510 | 5.4 (1.8 V) | " |

[a]Abbreviations: AC—activated carbon, ac—activated carbon, ACN—activated carbon nanofibers, C—carbon, G—graphene, MeCN—acetonitrile, MWCNT—multiwalled carbon nanotube, NCTs/ANPDM—N-doped-carbon-tubes/Au-nanoparticles-doped-MnO$_2$, PC—propylene carbonate, PEDOT—poly(ethylenedioxythiophene), PMMA—poly(methylmethacrylate), PVA—poly(vinyl alcohol).
[b]Specific capacity (volumetric), in F/g, measured at 100 mV/s unless otherwise specified.
[c]Gravimetric energy density, calculated based upon the mass of the active material only.
[d]Cycle stability, as defined by the authors.

Hermetically sealed two-layer sandwich capacitors were assembled and operated in moist (RH_55%) laboratory air. To assess the influence of $V_{max}$ on the cycle stability of Au@6-MnO2 nanowire sandwich capacitors, these devices were first cycled to $V_{max}$=1.2 V at 200 mV/s for 10,000 cycles. $V_{max}$ was then increased to 1.5 V for an additional 10,000 cycles, and finally to 1.8 V for an additional 80,000 cycles before terminating the experiment (FIGS. 10A-10C).

Figures 10A, 10B, 10C:
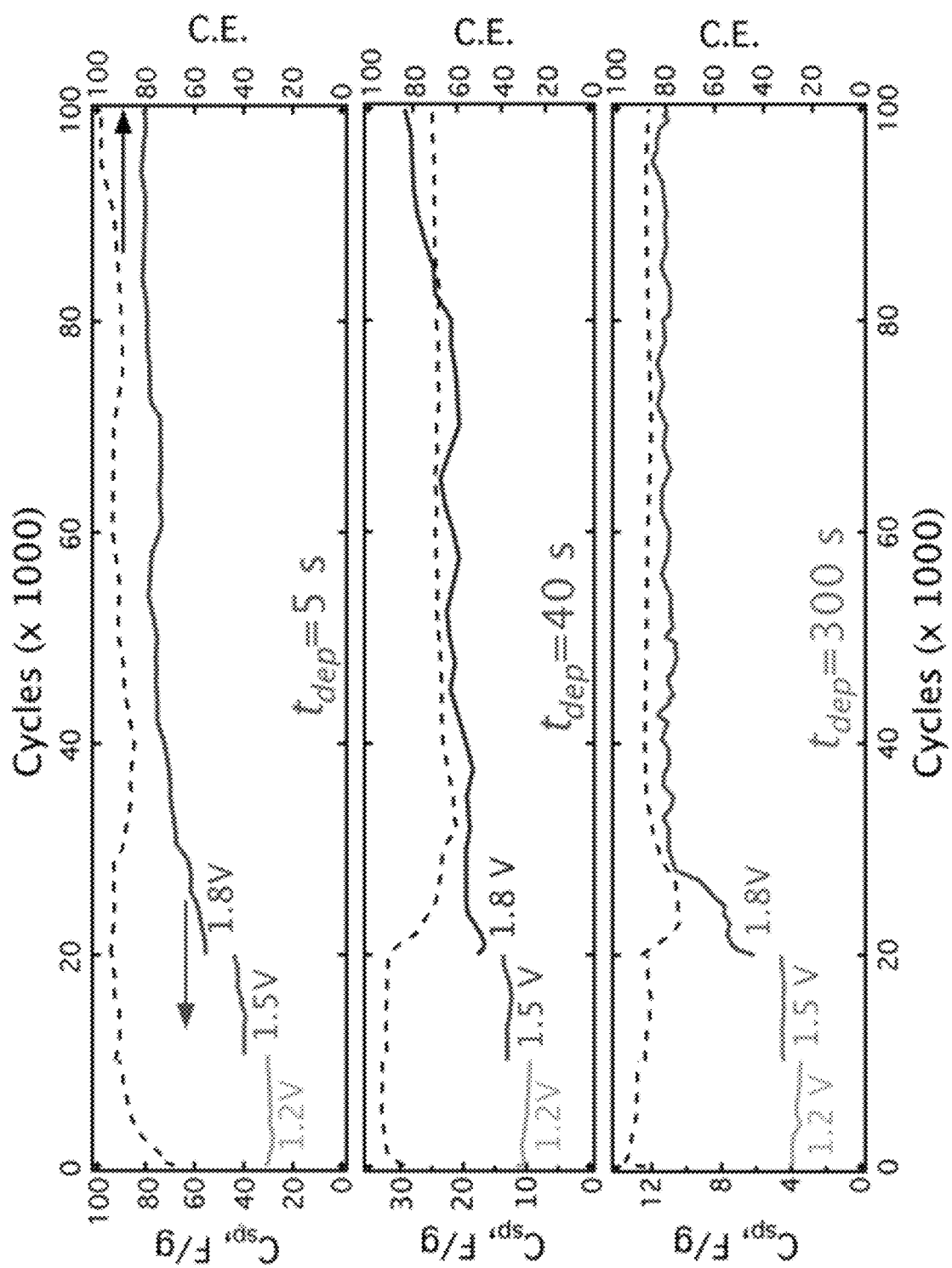
FIG. 10A illustrates $C_{sp}$ and coulombic efficiency (CE) as a function of the number of cycles for nanowires having deposition time $t_{dep}$=5 s (MnO2 shell thickness=65 nm), according to embodiments of the present disclosure.
FIG. 10B illustrates $C_{sp}$ and coulombic efficiency (CE) as a function of the number of cycles for nanowires having deposition time $t_{dep}$=40 s (MnO2 shell thickness=263 nm), according to embodiments of the present disclosure.
FIG. 10C illustrates $C_{sp}$ and coulombic efficiency (CE) as a function of the number of cycles for nanowires having deposition time $t_{dep}$=300 s (MnO2 shell thickness=367 nm), according to embodiments of the present disclosure.

FIG. 10A illustrates $C_{sp}$ and coulombic efficiency (CE) as a function of the number of cycles for nanowires having deposition time $t_{dep}$=5 s (MnO2 shell thickness=65 nm), according to embodiments of the present disclosure. FIG. 10B illustrates $C_{sp}$ and coulombic efficiency (CE) as a function of the number of cycles for nanowires having deposition time $t_{dep}$=40 s (MnO2 shell thickness=263 nm), according to embodiments of the present disclosure. FIG. 10C illustrates $C_{sp}$ and coulombic efficiency (CE) as a function of the number of cycles for nanowires having deposition time $t_{dep}$=300 s (MnO2 shell thickness=367 nm), according to embodiments of the present disclosure.

$C_{sp}$ versus cycle data for all three $d_{MnO2}$ values (FIGS. 10A-10C) demonstrates that no capacity fade was observed in these experiments. In fact, a slow and steady increase in $C_{sp}$ was usually seen across 100,000 cycles, as documented in the data for the devices of FIGS. 10A and 10B. The device of FIG. 10C showed an increase in $C_{sp}$ to 11 F/g at 27,000 cycles, and the $C_{sp}$ stabilized at this value for the remainder of the test. $V_{max}$ values as large as 1.8 V have not yet been successfully employed in any symmetrical or asymmetrical MnO2-based capacitors (Table 3). Using the present methodology, this $V_{max}$ is not only useable, but it is compatible with elevated $C_{sp}$ performance coupled with ultra-long cycle stability, to 100 k cycles.

Embodiments of the present disclosure demonstrate that a 3D nanowire capacitor, comprising stacked, planar 2D nanowire layers separated by thin PMMA gel electrolyte layers is feasible, and that such two-layer capacitors produce ultra-high cycle stability—to 100,000 cycles—also observed for single layers of nanowires operating in a PMMA gel electrolyte disclosed herein. The "sandwich" capacitor architecture disclosed herein includes two 4000 nanowire layers separated by a very thin 2 μm layer of PMMA gel electrolyte. This sandwich capacitor can be thought of as a "unit cell" of a many-layered, 3D capacitor comprising tens or hundreds of planar nanowire layers, spaced by micron-scale PMMA gelelectrolyte layers. For Au@δ-MnO2 core@shell nanowire capacitors, this sandwich capacitor architecture provides two advantages: First, it enables the $V_{max}$ to be increased from 1.2 V to 1.8 V, increasing the specific energy by a factor of 2.25 (theoretically) and 5-6-fold in practice. Second, it allows the volumetric capacity to be increased by a factor of more than 100—a combined consequence of increasing the nanowire density in each layer, and reducing the thickness of the PMMA gel electrolyte layer from 180 μm to 2 μm. A volumetric capacity of 500 mF/cm3 at 100 mV/s is thereby obtained. This number does not represent a limit. For example, a 2.5× higher packing volumetric density of nanowires is obtained by further reducing the inter-wire pitch to 2 μm from 5 Significantly, the cycle stability of the $C_{sp}$ is observed up to 100,000 cycles for sandwich capacitors operating at $V_{max}$=1.8V across a range of MnO2 shell thicknesses. These results demonstrate the feasibility of 3D nanowire (two-layer) capacitors with a cycle stability of 100,000+ cycles—comprising many, densely packed, planar nanowire layers separated by micron-scale PMMA gel electrolyte layers.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

In the description above, for purposes of explanation only, specific nomenclature is set forth to provide a thorough understanding of the present disclosure. However, it will be apparent to one skilled in the art that these specific details are not required to practice the teachings of the present disclosure.

All features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. Express recitation of every possible combination and substitution is overly burdensome, especially given that the permissibility of each and every such combination and substitution will be readily recognized by those of ordinary skill in the art upon reading this description.

In many instances entities are described herein as being coupled to other entities. It should be understood that the terms "coupled" and "connected" (or any of their forms are used interchangeably herein and, in both cases, are generic to the direct coupling of two entities (without any non-negligible (e.g., parasitic intervening entities) and the indirect coupling of two entities (with one or more non-negligible intervening entities)). Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed:

1. A nanowire energy storage device, comprising:
   a first nanowire energy storage device having
     a cathode,
     an anode, wherein one or more of the cathode and the anode comprises a plurality of nanowires, and
     a poly(methylmethacrylate) (PMMA) electrolyte gel, wherein the cathode and the anode are embedded in the PMMA electrolyte gel, and
   a second nanowire energy storage device having
     a cathode,
     an anode, wherein one or more of the cathode and the anode comprises a plurality of nanowires, and
     a poly(methylmethacrylate) (PMMA) electrolyte gel, wherein the cathode and the anode are embedded in the PMMA electrolyte gel,
   wherein a total poly(methylmethacrylate) (PMMA) gel layer thickness of the nanowire energy storage device is 2 µm.

2. The storage device of claim 1, wherein the storage device is one of a battery and a capacitor.

3. The storage device of claim 1, wherein the anode and cathode the first and second storage devices are coupled to metal contacts.

4. The storage device of claim 3, wherein the metal contacts are gold contacts.

5. The storage device of claim 1, wherein the plurality of nanowires has a reversible cycle stability of more than 200,000 cycles.

6. The storage device of claim 1, wherein the plurality of nanowires are symmetrical δ-MnO2 nanowires.

7. The storage device of claim 1, wherein the first nanowire energy storage device and the second nanowire storage device are pressed together such that electrical contacts are on opposite ends of the storage device with sufficient offset of a glass layer of the first nanowire storage device and a glass layer of the second nanowire storage device.

8. The storage device of claim 1, wherein the device is hermetically sealed using hot glue.

9. The storage device of claim 1, wherein an operating voltage of the storage device is 1.8 V.

10. The storage device of claim 1, wherein the storage device has a reversible cycle stability of more than 100,000 cycles.

* * * * *

UNITED STATES PATENT AND TRADEMARK OFFICE
CERTIFICATE OF CORRECTION

PATENT NO. : 10,347,434 B2
APPLICATION NO. : 15/584652
DATED : July 9, 2019
INVENTOR(S) : Reginald M. Penner and Mya Le Thai It is certified that error appears in the above-identified patent and that said Letters Patent is hereby corrected as shown below:

In the Specification

In Column 1, after Line 15, please add:
"STATEMENT REGARDING FEDERALLY SPONSORED RESEARCH
This invention was made with Government support under Grant No. DESC0001160 awarded by the Department of Energy. The Government has certain rights in the invention."

Signed and Sealed this
Third Day of January, 2023

*Katherine Kelly Vidal*

Katherine Kelly Vidal
*Director of the United States Patent and Trademark Office*